(12) United States Patent
Takahashi

(10) Patent No.: US 8,760,692 B2
(45) Date of Patent: Jun. 24, 2014

(54) SYSTEM, APPARATUS, METHOD, AND COMPUTER PROGRAM FOR INFORMATION PROCESSING RESOURCE ADJUSTMENT

(75) Inventor: Takeshi Takahashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 266 days.

(21) Appl. No.: 13/206,727

(22) Filed: Aug. 10, 2011

(65) Prior Publication Data

US 2012/0042065 A1 Feb. 16, 2012

(30) Foreign Application Priority Data

Aug. 16, 2010 (JP) ................................ 2010-181896

(51) Int. Cl.
*G06F 3/12* (2006.01)
*G06F 1/00* (2006.01)

(52) U.S. Cl.
USPC .......................................... 358/1.15; 713/323

(58) Field of Classification Search
USPC ........ 358/1.15, 1.9, 1.13, 1.14, 1.18; 713/323
See application file for complete search history.

(56) References Cited

U.S. PATENT DOCUMENTS

| | | | | |
|---|---|---|---|---|
| 7,056,039 B2* | 6/2006 | Mokuya et al. | ................... | 400/76 |
| 8,270,851 B2* | 9/2012 | Yamamichi | ....................... | 399/8 |
| 8,482,753 B2* | 7/2013 | Urasawa | ....................... | 358/1.14 |
| 2002/0041389 A1* | 4/2002 | Noda | ........................... | 358/1.14 |
| 2004/0143710 A1* | 7/2004 | Walmsley | ..................... | 711/144 |
| 2009/0210733 A1* | 8/2009 | Akiba | ........................... | 713/323 |
| 2011/0157638 A1* | 6/2011 | Yamada | ....................... | 358/1.15 |
| 2011/0279844 A1* | 11/2011 | Urasawa | ..................... | 358/1.13 |
| 2011/0299120 A1* | 12/2011 | Sekine et al. | ................ | 358/1.15 |
| 2012/0026499 A1* | 2/2012 | Tanaka | .......................... | 356/402 |
| 2013/0163037 A1* | 6/2013 | Huster | ......................... | 358/1.15 |

FOREIGN PATENT DOCUMENTS

| | | | | |
|---|---|---|---|---|
| JP | 2004-315220 | * 11/2004 | ............. | G03G 21/00 |
| JP | 2006-338443 | * 12/2006 | ............... | G06F 3/12 |
| JP | 2009-110347 A | 5/2009 | | |

* cited by examiner

*Primary Examiner* — Jerome Grant, II

(74) *Attorney, Agent, or Firm* — Canon USA, Inc. IP Division

(57) ABSTRACT

A state acquisition unit is configured to acquire information relating to a state of an apparatus making processing requests regarding jobs. Resources are adjusted by an adjusting unit configured to adjust increase or decrease of each of the first resource and the second resource, based on the basis of the information acquired by the state acquisition unit.

19 Claims, 21 Drawing Sheets

Request:
PUT http://print-sv.queue.net/device3/ ~601
Headers: ~602
x-ms-date: Mon, 14 Sep 2009 17:00:25 GMT
Authorization:SharedKey dev_0001queue:sr8rIheJmCd6npMSx7DfAY3L/V3uWvSXOzUBCV9wnk=

Body:
<QueueMessage> ~603
   <MessageText>
      <Type>PRINT</Type>
      <BlobURI>http://print-sv.blob.net/device3/folder/file.doc</BlobURI>
      <DocId>folder/file.doc</DocId>
   </MessageText>
</QueueMessage>

Request:
PUT http://scan-sv.queue.net/device3/ ~601
Headers: ~602
x-ms-date: Mon, 15 Sep 2009 17:00:25 GMT
Authorization:SharedKey dev_0001queue:sr8rIheJmCd6npMSx7DfAY3L/V3uWvSXOzUBCV9wnk=

Body:
<QueueMessage> ~604
   <MessageText>
      <Type>SCAN</Type>
      <BlobURI>http://print-sv.blob.net/device3/folder/file.doc</BlobURI>
      <DocId>folder/file.doc</DocId>
   </MessageText>
</QueueMessage>

FIG. 6C

```
600
Request:
PUT http://print-sv.queue.net/device3/ ~~ 601
Headers: ~~ 602
x-ms-date: Mon, 16 Sep 2009 17:00:25 GMT
Authorization:SharedKey dev_0001queue:sr8rIheJmCd6npMSx7DfAY3L//V3uWvSXOzUBCV9wnk=

Body:
<QueueMessage> ~~ 605
    <MessageText>
        <Type>MOVE</Type>
        <Queue>http://print-sv.queue.net/global/</Queue>
    </MessageText>
</QueueMessage>
```

FIG. 6D

```
600
Request:
PUT http://print-sv.queue.net/device3/ ~~ 601
Headers: ~~ 602
x-ms-date: Mon, 16 Sep 2009 17:00:25 GMT
Authorization:SharedKey dev_0001queue:sr8rIheJmCd6npMSx7DfAY3L//V3uWvSXOzUBCV9wnk=

Body:
<QueueMessage> ~~ 606
    <MessageText>
        <Type>KILL</Type>

</MessageText>
</QueueMessage>
```

FIG. 8

| E-TAG | PARTITION KEY | ROW KEY | PRINT QUEUE URI | SCAN QUEUE URI | PRINT CONTAINER URI | SCAN CONTAINER URI | DEVICE TYPE |
|---|---|---|---|---|---|---|---|
| awe4jsm | resource | device1 | http://print-sv.queue.net/global/ | http://scan-sv.queue.net/global/ | http://print-sv.blob.net/global/ | http://scan-sv.blob.net/global/ | global |
| judjtgh | resource | device2 | http://print-sv.queue.net/global/ | http://scan-sv.queue.net/global/ | http://print-sv.blob.net/global/ | http://scan-sv.blob.net/global/ | global |
| gawegwe | resource | device3 | http://print-sv.queue.net/device3/ | http://scan-sv.queue.net/device3/ | http://print-sv.blob.net/device3/ | http://scan-sv.blob.net/device3/ | special |

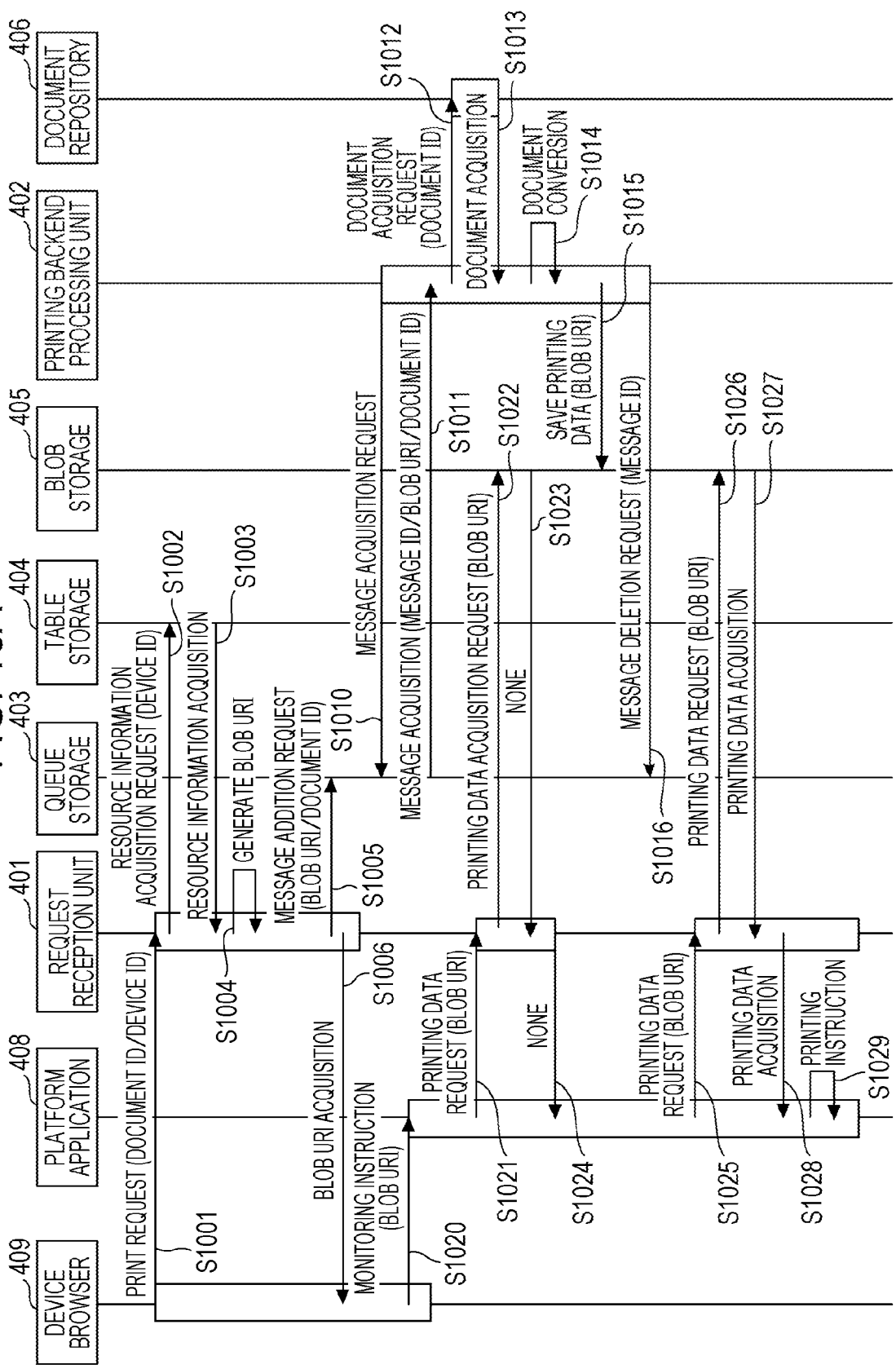

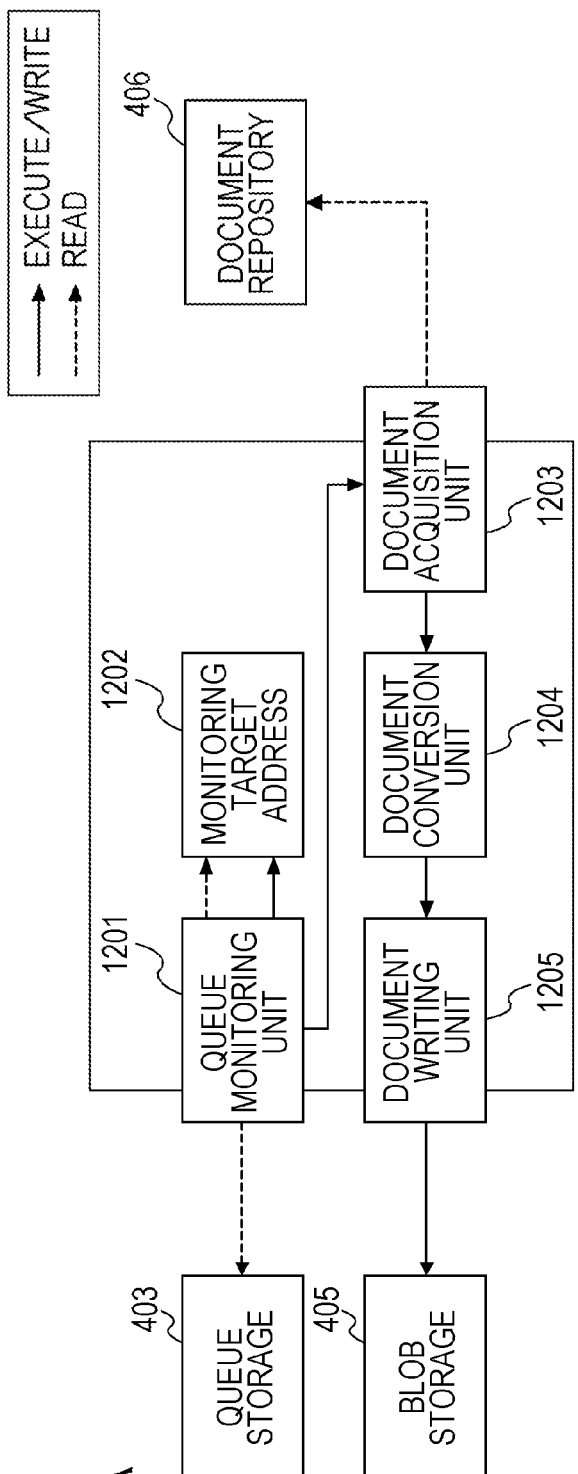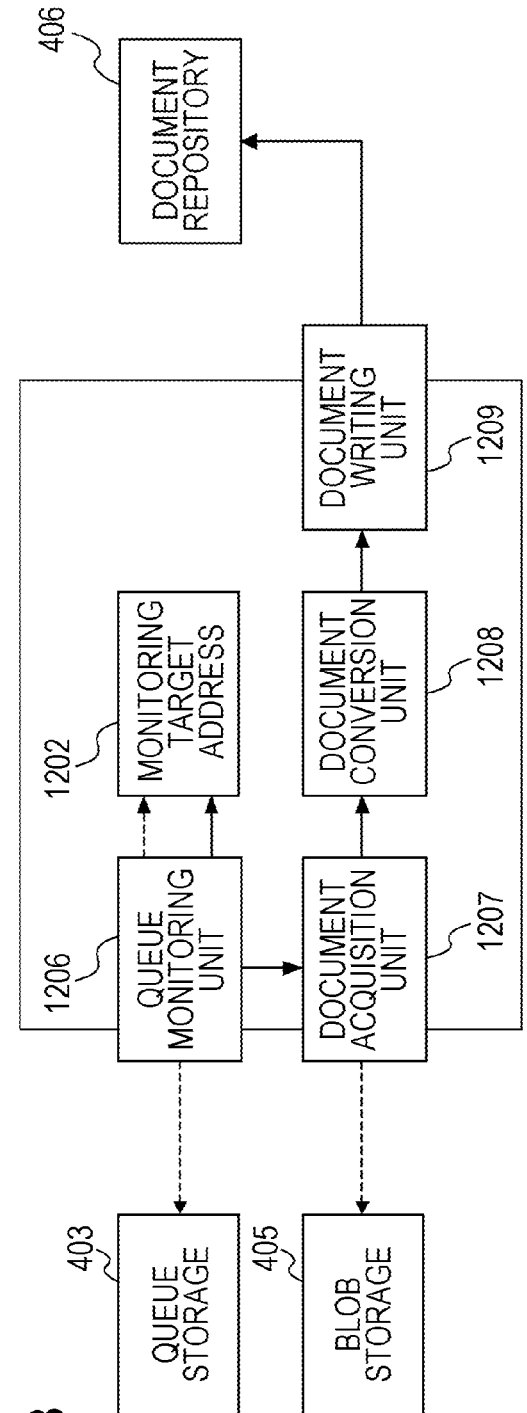

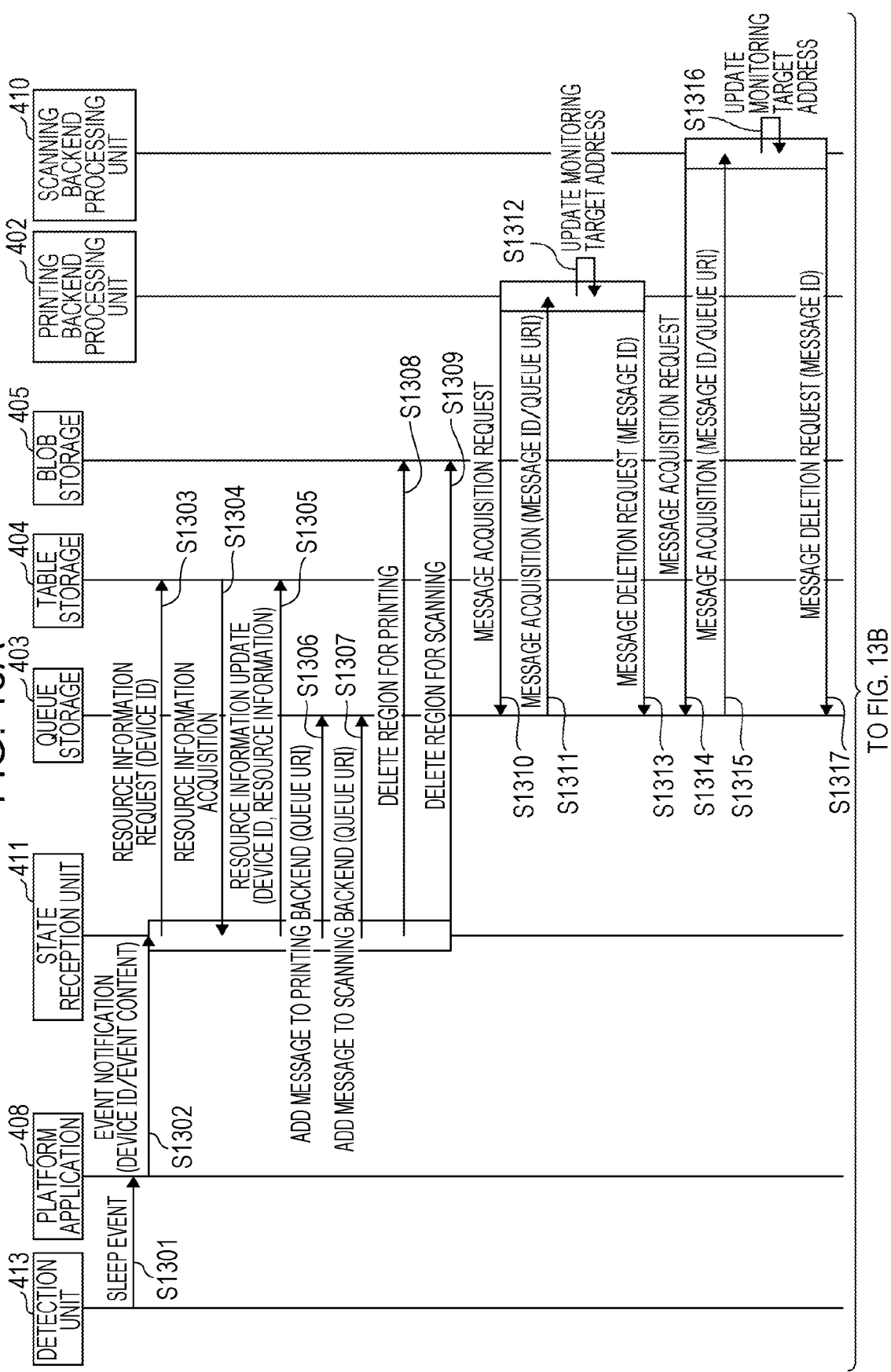

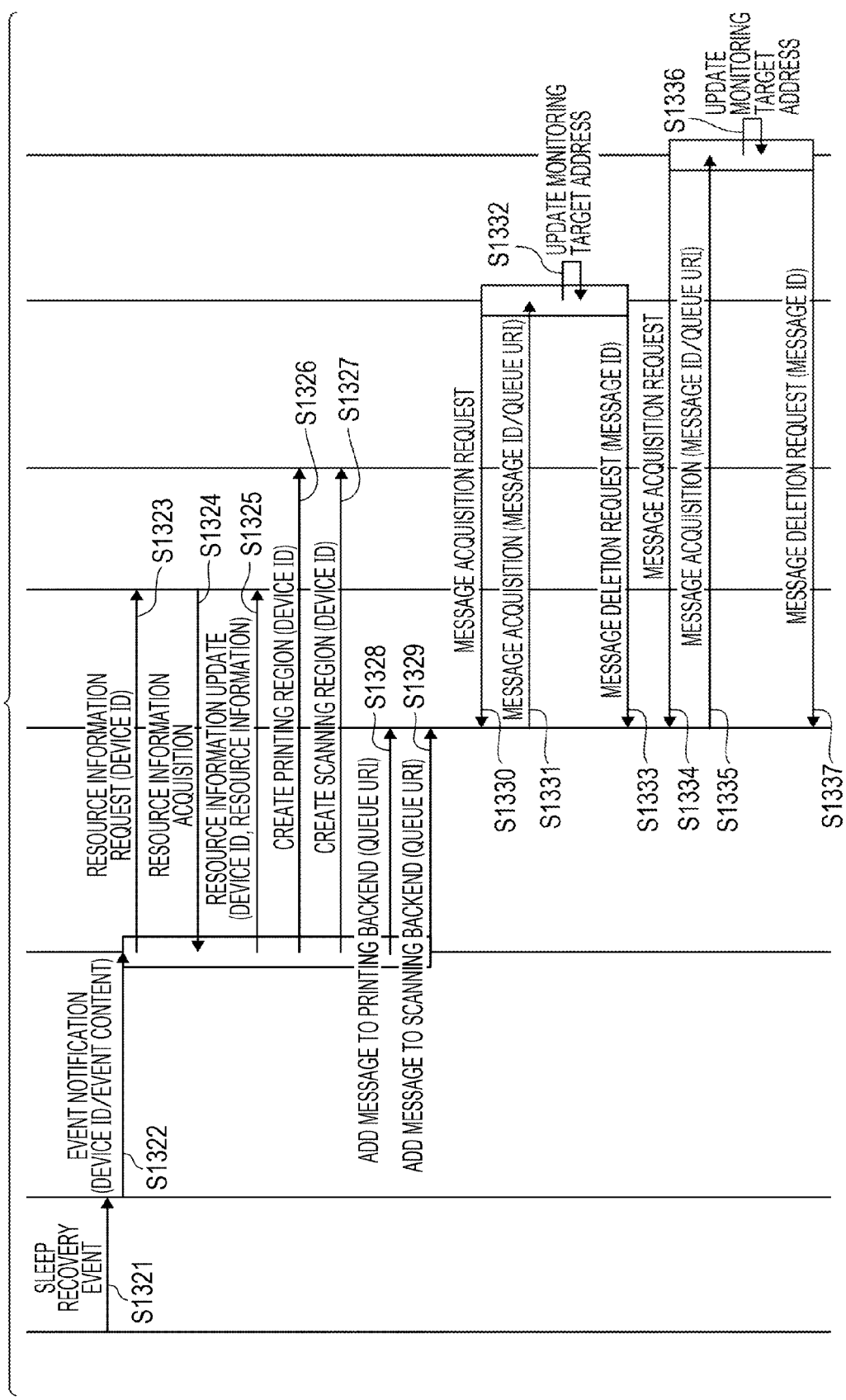

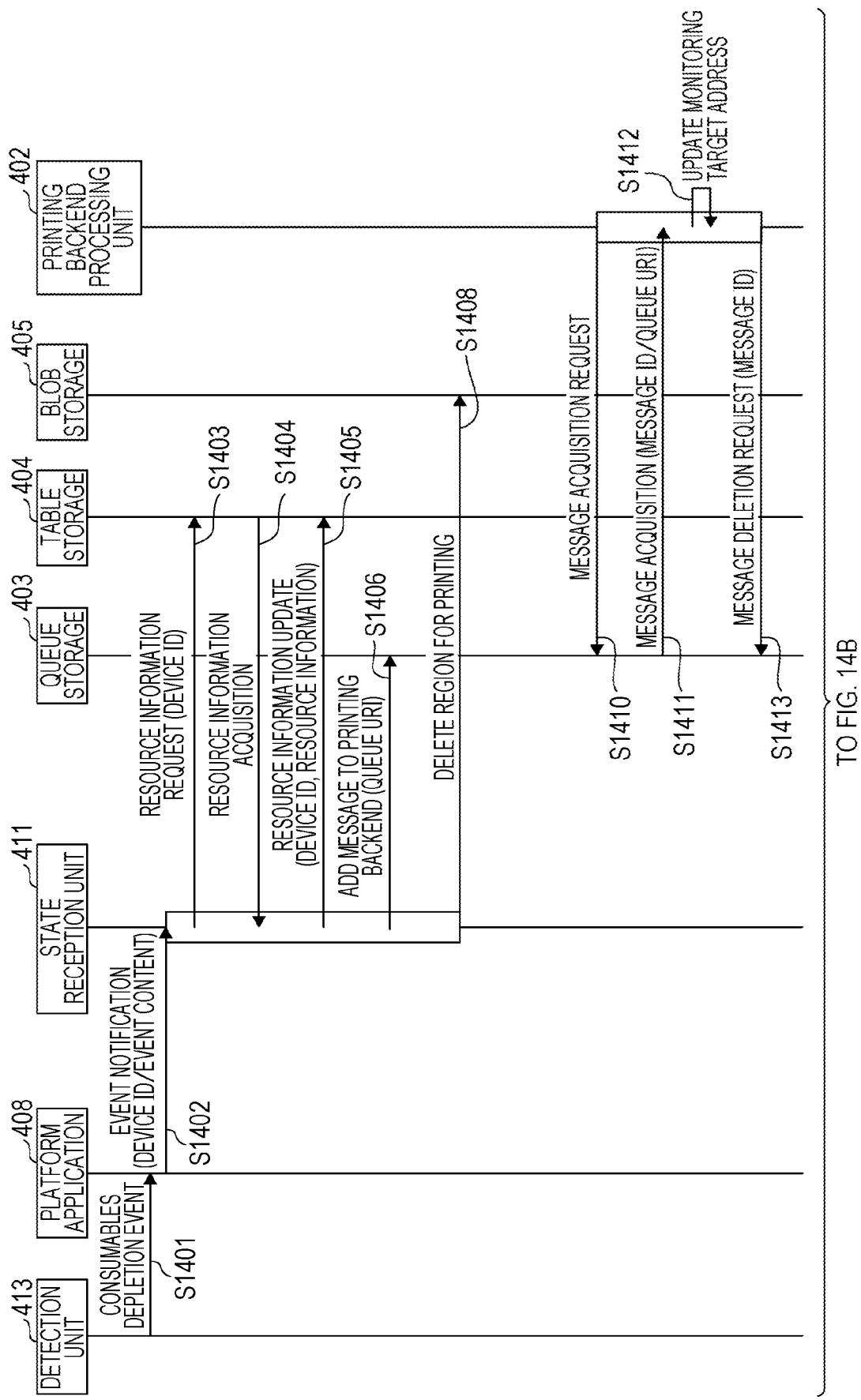

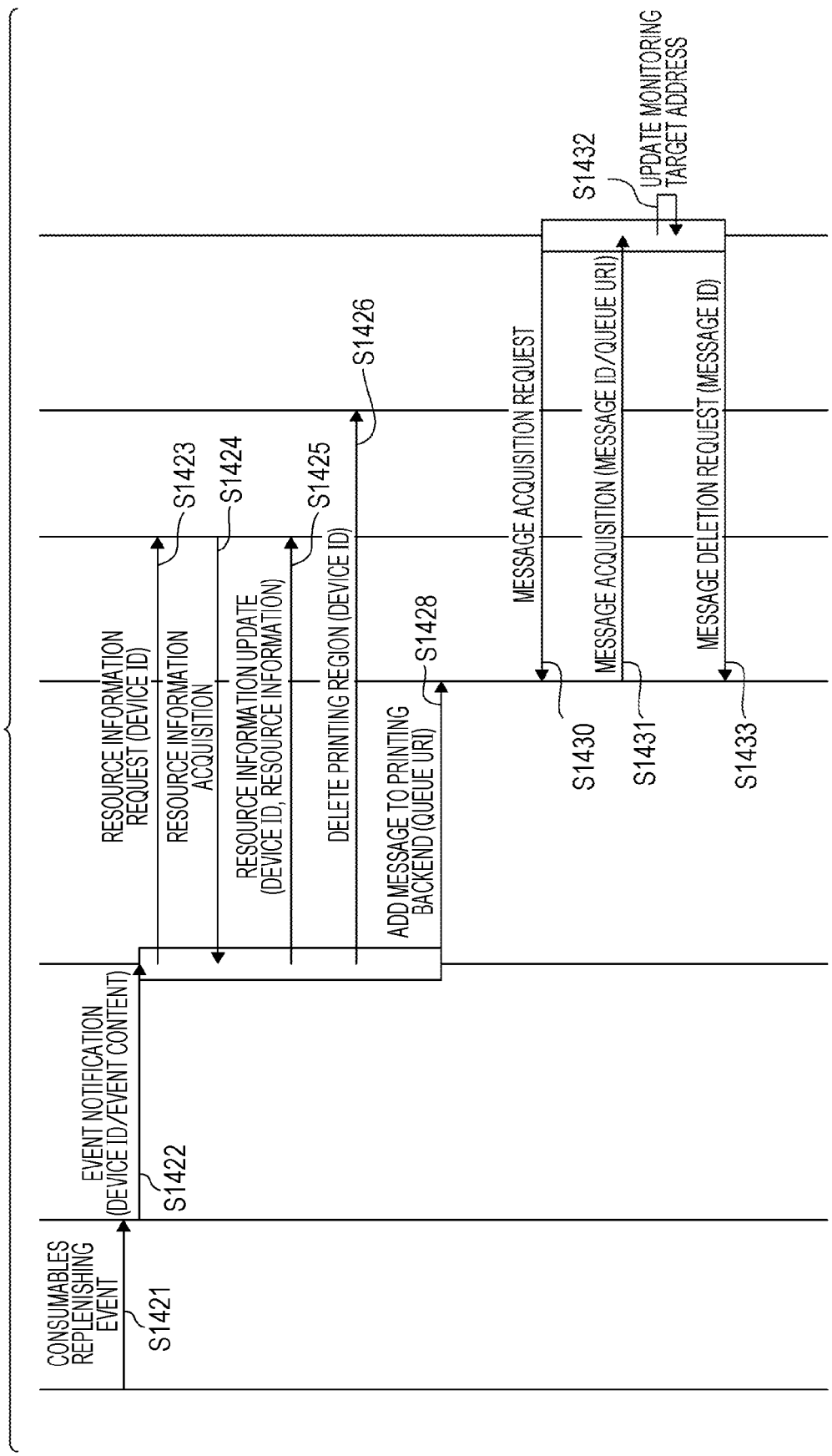

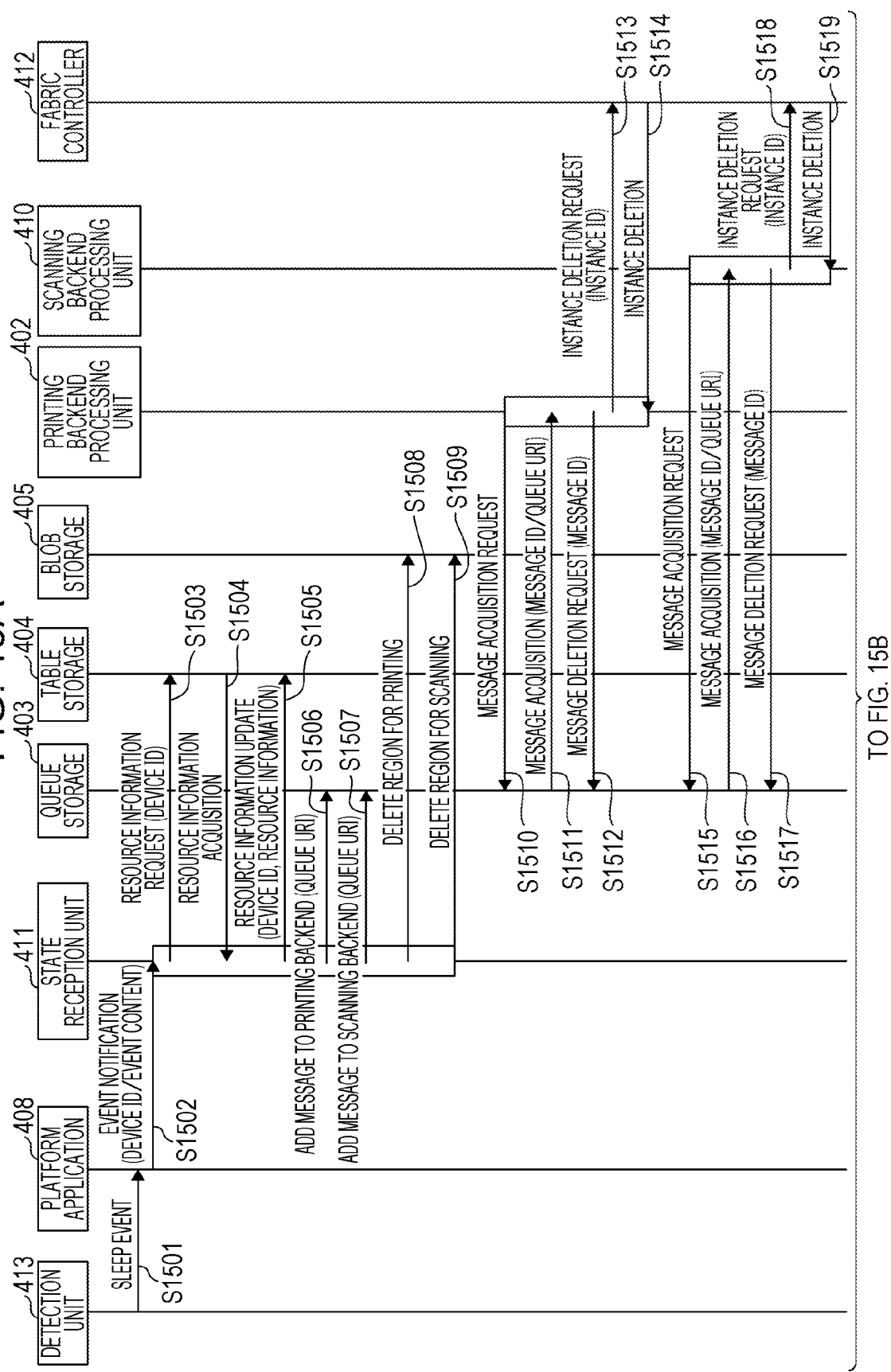

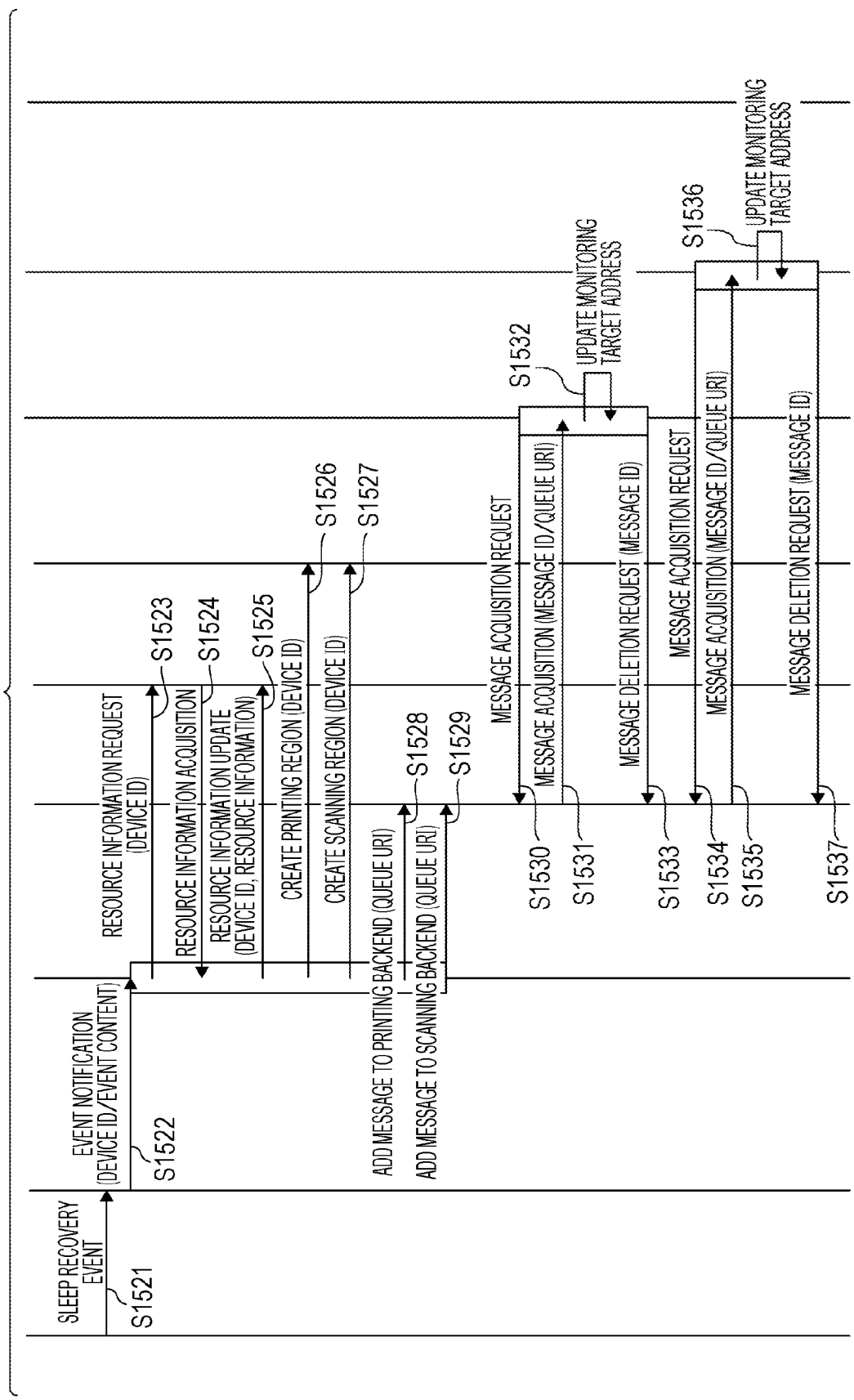

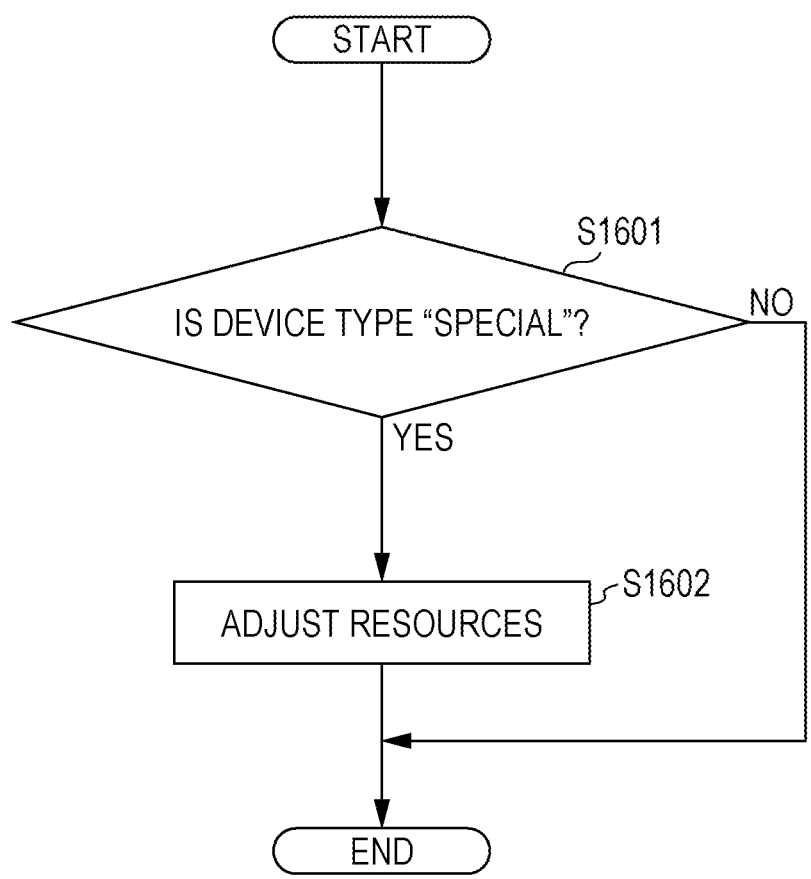

SYSTEM, APPARATUS, METHOD, AND COMPUTER PROGRAM FOR INFORMATION PROCESSING RESOURCE ADJUSTMENT

BACKGROUND OF THE INVENTION

1. Field of the Invention

Embodiments of the present invention relate to a system, an apparatus, a method, and a computer program for information processing resource adjustment.

2. Description of the Related Art

Client-server systems, which process jobs requested by client computers, using resources which server computers have, are in widespread use. Such resources as referred to here include computing resources for executing processing of jobs, such as a central processing unit (CPU) or the like, and storage resources for storing data, such as hard disk drives (HDDs).

Also, in recent years, use has begun of technologies called cloud computing and SaaS (Software as a Service), as a form in which various types of processing are performed at the side of server computers, which are connected to by client computers via network. With cloud computing, many resources at the server computer side are used, and various types of jobs such as data conversion and data processing requested by client computers are executed in a dispersed manner, thereby enabling requests made from many client computers to be processed at the same time.

Japanese Patent Laid-Open No. 2009-110347 discloses a client-server system in which there coexist the different resource models of an exclusive resource model where a particular client computer (e.g., exclusive client) is given exclusive use of a group of resources at the server computer side, and a shared resource model where multiple client computers (e.g., sharing clients) share a group of resources at the server computer side. With the exclusive resource model in this client-server system, jobs requested by an exclusive client are processed by resources used by the exclusive resource model. Also, with the shared resource model in this client-server system, jobs requested by sharing clients are processed by resources used by the shared resource model.

With a client-server system, if no processing of jobs is requested from a client computer, the resources at the server computer side are hoarded and become idle resources. In particular, with a client-server system having an exclusive resources model, the resources of the exclusive resource model are hoarded while there is no request for job processing from the exclusive client. Japanese Patent Laid-Open No. 2009-110347 discloses a technique whereby deterioration in usage efficiency of resources may be alleviated by detecting the processing load of resources of the exclusive resource model by the system administrator server, and adjusting the amount of resources of the exclusive resource model based on the detected processing load.

However, with the technique disclosed in Japanese Patent Laid-Open No. 2009-110347, the amount of resources of the exclusive resource model is adjusted based on the processing load of the resources of the exclusive resource mode, so in the event that a request is made for job processing from an exclusive client after a considerable amount of time, sufficient resources for processing the requested job may not be secured in the resources of the exclusive resource mode. In this case, the job processing efficiency in the exclusive resource model will drop until sufficient resources for processing the job are secured.

SUMMARY OF THE INVENTION

One disclosed aspect of the embodiments provides a resource adjusting system, a resource adjusting apparatus, a resource adjusting method, and a program thereof, which, in the event that a client computer has requested job processing, resources of a sufficient amount for processing that job are secured beforehand, yet deterioration in usage efficiency of resources is alleviated.

An adjusting apparatus adjusts a first resource and a second resource. The first and second resources process jobs requested from first and second information processing apparatuses, respectively. In other words, the first resource processes jobs requested from the first information processing apparatus and the second resource processes jobs requested from the second information processing apparatus. The adjusting apparatus includes: a state acquisition unit configured to acquire information for distinguishing transition of the state of the first information processing apparatus; and an adjusting unit configured to reduce the first resource in the event that the information acquired by the state acquisition unit is first information distinguishing transition from a first state to a second state, and change the second resource to the first resource in the event that the information acquired by the state acquisition unit is second information distinguishing transition from the second state to the first state.

According to one disclosed aspect of the embodiments, resources at the server computer side may be secured in an efficient manner, and also deterioration in usage efficiency of resources may be alleviated.

Further features of the present invention will become apparent from the following description of exemplary embodiments with reference to the attached drawings.

BRIEF DESCRIPTION OF THE DRAWINGS

FIGS. 6A through 6D are diagrams illustrating a queue message according to an embodiment of the present invention.

FIG. 8 is a diagram illustrating a resource table according to an embodiment of the present invention.

FIGS. 10A and 10B are sequence diagrams illustrating the flow of printing and scanning processing according to an embodiment of the present invention.

FIGS. 12A and 12B are structural diagrams of a back end processing unit according to an embodiment of the present invention.

FIG. 13A and FIG. 13B form a sequence diagram illustrating the flow of resource adjustment processing according to a first embodiment of the present invention.

FIG. 14A and FIG. 14B form a sequence diagram illustrating the flow of resource adjustment processing according to a third embodiment of the present invention.

FIG. 15 is a sequence diagram illustrating the flow of resource adjustment processing according to a second embodiment of the present invention.

FIG. 16 is a flowchart for determining the device type of an image forming apparatus, to start resource adjustment according to an embodiment of the present invention.

DESCRIPTION OF THE EMBODIMENTS

First Embodiment

Embodiments will be described with regard to a system which performs scanning processing and printing processing over a network (network scan/print system) as a client-server system.

One disclosed feature of the embodiments may be described as a process which is usually depicted as a flowchart, a flow diagram, a timing diagram, a structure diagram, or a block diagram. Although a flowchart or a timing diagram may describe the operations or events as a sequential process, the operations may be performed, or the events may occur, in parallel or concurrently. In addition, the order of the operations or events may be re-arranged. A process is terminated when its operations are completed. A process may correspond to a method, a program, a procedure, a method of manufacturing or fabrication, a sequence of operations performed by an apparatus, a machine, or a logic circuit, etc.

Figure 1:
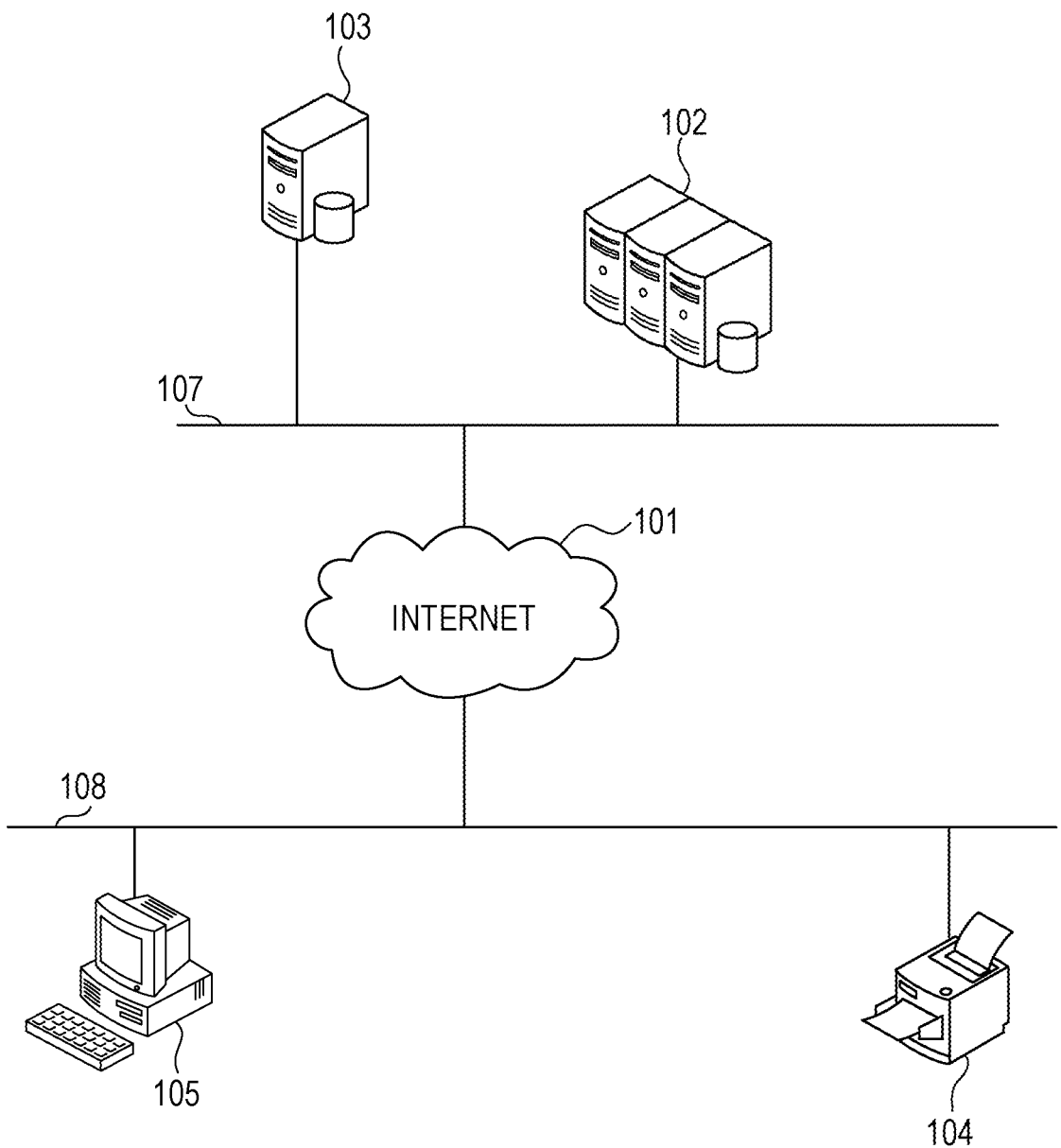
FIG. 1 is a diagram illustrating the configuration of a network scan/print system according to an embodiment of the present invention.

The apparatuses making up the network scan/print system according to the present embodiment will be described in detail with reference to FIG. 1. FIG. 1 illustrates the apparatuses making up the network scan/print system being connected via the Internet 101 and networks 107 and 108. The apparatuses making up the network scan/print system are a sever computer group 102, a document server 103, an image forming apparatus 104, and a PC terminal 105.

The networks 107 and 108 are communication lines for exchanging information between the above-described apparatuses. The Internet 101 is a communication line for exchanging information between the apparatuses beyond firewalls. The Internet 101 enables communication from the network 108 to which the image forming apparatus 104 and PC terminal 105 belong to the network 107 to which the server computer group 102 and the like belong, beyond firewalls. The networks 107 and 108, and Internet 101 are communication lines supporting the TCP/IP protocol and so forth for example, and whether these are cable or wireless networks is irrelevant. In FIG. 1, the server computer group 12 is configured of multiple server computers, but this may be configured of a single server computer.

Figure 2:
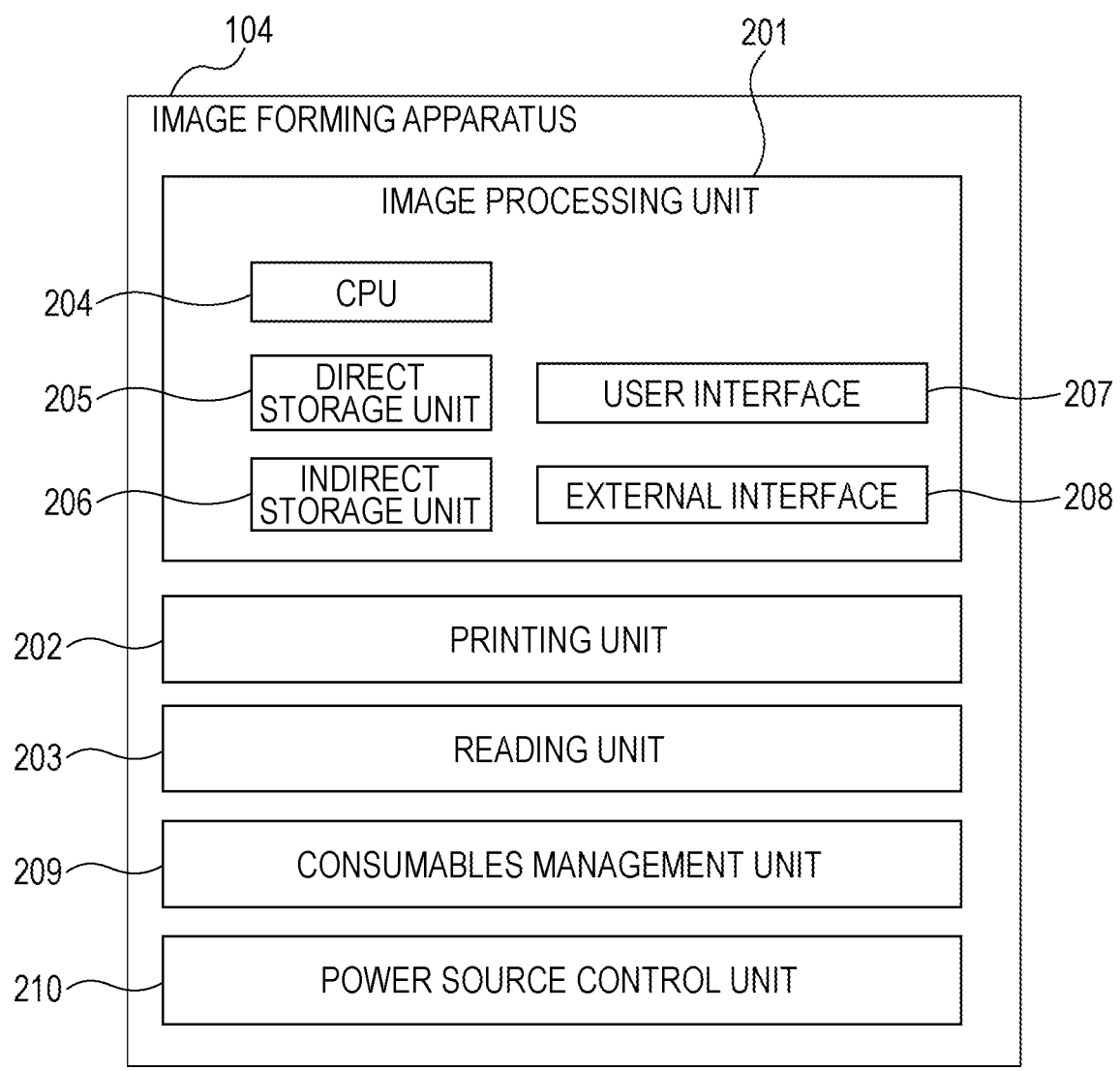
FIG. 2 is a diagram illustrating the details of the internal configuration of an image forming apparatus according to an embodiment of the present invention.

Next, the internal configuration of each of the apparatuses making up the network scan/print system shown in FIG. 1 will be described in detail. First, the internal configuration of the image forming apparatus 104 will be described with reference to FIG. 2. FIG. 2 is a block diagram exemplarily illustrating the internal configuration of the image forming apparatus 104.

The image forming apparatus 104 includes an image processing unit 201, a printing unit 202, a reading unit 203, a consumables management unit 209, and a power source control unit 210. The image processing unit 201 includes a CPU 204, a direct storage unit 205, an indirect storage unit 206, a user interface 207, and an external interface 208.

The CPU 204 loads a predetermined program stored in the indirect storage unit 206 to the direct storage unit 205, and executes this program, thereby executing predetermined processing. The direct storage unit 205 is realized by volatile memories such as random access memory (RAM). The indirect storage unit 206 is realized by a non-volatile storage medium such as a solid state drive (SSD) or HDD or the like, with various types of programs including application programs and platform programs being stored in these storage media. A platform program is for providing an environment (e.g., platform) for executing application programs described in an object-oriented manner. Note that the CPU 204 may be multiple processors coupled to perform multiprocessing.

Now, description will be made in detail regarding a platform realized by executing a platform program. By realizing a platform, new application programs (hereinafter referred to as "application") which the user has developed himself/herself may be executed at the CPU 204 of the image forming apparatus 104, and also the operating screen of the image forming apparatus 104 may be customized.

A method for realizing a platform will be described. The CPU 204 loads a platform program stored in the indirect storage unit 206 to the direct storage unit 205. Upon the loading being completed, the CPU 204 is in a state wherein the platform program may be executed. With the present embodiment, the CPU 204 executing the platform program will be referred to as the platform starting up. Note that the platform runs on firmware of the image forming apparatus 104.

A method for executing an application program on a platform will be described in detail. With the present embodiment, a printing software program (hereinafter referred to as printing software) which accepts print requests, for example, is running on the platform. The printing software may receive printing data from devices connected thereto via a network by communication protocols such as HTTP (Hyper Text Transfer Protocol), for example. The printing software transmits the received printing data to the firmware, and the firmware which has received the printing data starts processing of printing data. Note that in the event that the printing data is such that printing may be performed without processing, the firmware omits the processing of the printing data. Thus, by executing application programs on the platform, control of the image forming apparatus 104 may be realized.

Description will be made regarding the executing method of an application program. The platform which has been started up loads the application program stored in the indirect storage unit 206 to the direct storage unit 205. Upon the loading being completed, the application program is in a state of being capable of being executed on the platform. The CPU 204 then executes the application program on the platform. The function of the platform, in which the CPU 204 thus executes the application program on the platform whereby a software service may be provided, is referred to as a platform application with the present embodiment.

The user interface 207 is a unit necessary for accepting processing commissioning from the user. Signals corresponding to instructions input by the user are received via a keyboard, mouse, or the like, for example.

The external interface 208 is capable of reception of data from external devices and transmission of data to external devices. Examples of external devices include externally connected storage apparatuses such as an externally connected HDD or externally connected USB memory or the like, and separate apparatuses such as separate host computers or image forming apparatuses and so forth connected via a network. The image forming apparatus 104 is communicable with the PC terminal 105, server computer group 102, and so forth, via the networks 107 and 108 and the Internet 101.

The printing unit 202 has a function of printing the printing data subjected to printing data processing, onto a recording medium. The reading unit 203 has a function of reading an original placed on an original plate, and generating an original image. The reading unit 203 according to the present embodiment is a scanner.

The consumables management unit 209 is a unit for storing and managing consumables (toner, ink, paper, etc.) necessary for printing. Upon detecting insufficiency of consumables necessary for printing (insufficient toner/ink or no more paper), the consumables management unit 209 issues a consumables insufficiency event to the platform application. Also, in the event that the consumables have been replenished and a printable state is detected, the consumables management unit 209 issues a consumables replenished event to the platform application. The platform application which has received the consumables insufficiency event or consumables replenished event may execute processing corresponding to the event.

The power source control unit 210 detects change in the state of the image forming apparatus 104 in order to control the power source of the image forming apparatus 104, and instructs the CPU 204 to perform executing of processing corresponding to the contents of detection.

For example, in the event that the power source control unit 210 detects that the user has pressed a power source switch of the image forming apparatus 104 to turn the power on, start-up processing to switch the image forming apparatus 104 to an operable normal state is executed. The power source control unit 210 instructs the CPU 204 to load programs necessary to start up the image forming apparatus 104 from the indirect storage unit 206 to the direct storage unit 205, and the image forming apparatus 104 starts up. Upon completing the determined start-up processing, the CPU 204 which executes the program for start-up processing issues a start-up event to the platform application.

Also, for example, in the event that the power source control unit 210 detects that the user has pressed the power source switch of the image forming apparatus 104 to turn the power off, shut-down processing to switch the image forming apparatus 104 to a shut-down state is executed. The power source control unit 210 instructs the CPU 204 to load programs necessary to shut down the image forming apparatus 104 from the indirect storage unit 206 to the direct storage unit 205, and the image forming apparatus 104 is shut down. At the time of starting the determined shut-down processing, the CPU 204 which executes the program for shut-down processing issues a shut-down event to the platform application.

Also, for example, in the event that the power source control unit 210 detects that the user has pressed a power save switch of the image forming apparatus 104 in a normal state to turn power saving on, or that the power source control unit 210 detects that the image forming apparatus 104 has not executed processing for a predetermined amount of time, sleep processing to switch the image forming apparatus 104 to a power saving state is executed. The power source control unit 210 instructs the CPU 204 to load programs necessary to sleep the image forming apparatus 104 from the indirect storage unit 206 to the direct storage unit 205, and the image forming apparatus 104 is put to sleep. At the time of starting the determined sleep processing, the CPU 204 which executes the program for sleep processing issues a sleep event to the platform application.

Also, for example, in the event that the power source control unit 210 detects that the user has pressed a power save switch of the image forming apparatus 104 in a sleep state to turn power saving off, sleep wake-up processing to wake up the image forming apparatus 104 from the sleep state is executed. The power source control unit 210 realizes sleep wake-up processing for image forming apparatus 104 to recover from a power saving state. The power source control unit 210 instructs the CPU 204 to load programs necessary to wake the image forming apparatus 104 from the power staving state from the indirect storage unit 206 to the direct storage unit 205, and the image forming apparatus 104 wakes up from the power saving state. At the time of completing the determined sleep wake-up processing, the CPU 204 which executes the program for sleep wake-up processing issues a sleep wake-up event to the platform application.

These startup/shut-down/sleep/sleep wake-up events may be received at the platform application as state events, and the platform application may execute processing corresponding to the events.

Figure 3:
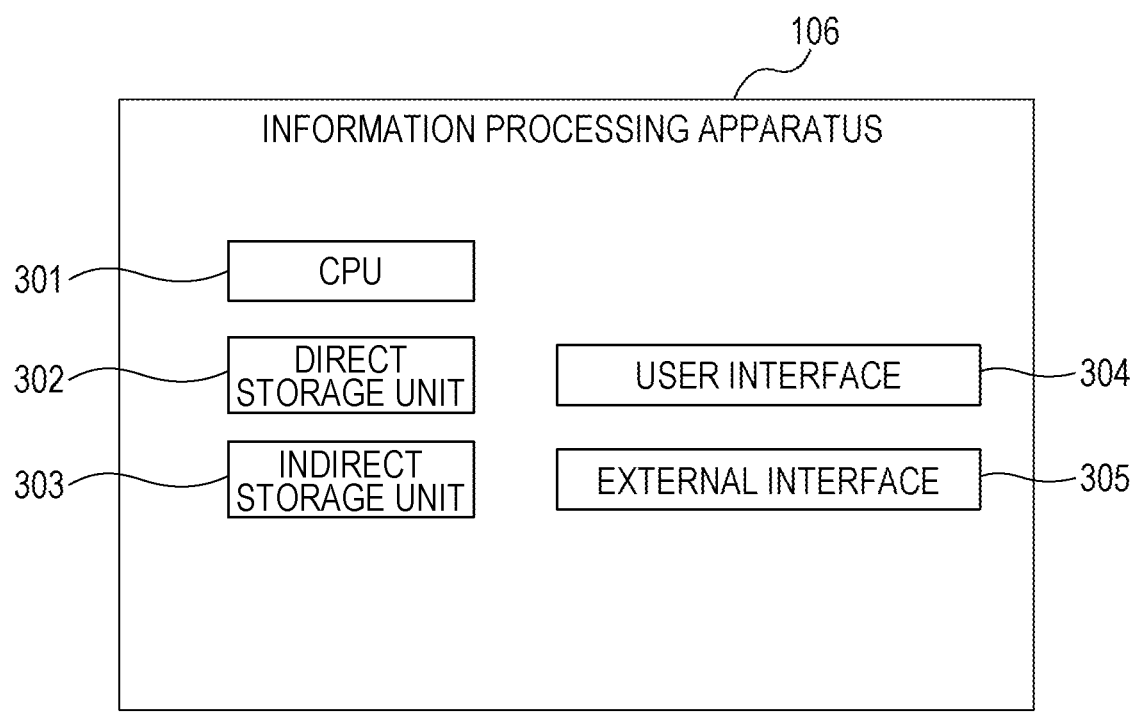
FIG. 3 is a diagram illustrating the details of the internal configuration of an information processing apparatus according to an embodiment of the present invention.

Next, the internal configuration of an information processing device functioning as one of the servers of the server computer group 102, document server 103, and PC terminal 105, will be described with reference to FIG. 3. FIG. 3 is a block diagram exemplarily illustrating the internal configuration of the information processing device 106. The information processing device 106 is configured of a CPU 301, direct storage unit 302, indirect storage unit 303, user interface 304, and external interface 305.

The user interface 304 is a unit necessary for accepting processing commissioning from the user. Signals corresponding to instructions input by the user are received via a keyboard, mouse, or the like, for example.

The CPU 301 executes predetermined programs and instructs the information processing apparatus 106 to perform various types of control. The CPU 301 is realized by a CPU, a microprocessor, a processor, a programmable device, or any device that may execute instructions. The direct storage unit 302 is work memory used at the time of the CPU 301 executing programs, and programs executed by the CPU 301 are loaded to the direct storage unit 302. The direct storage unit 302 is configured of RAM. The indirect storage unit 303 stores various types of programs including application programs and OS (Operating System). The various types of programs stored in the indirect storage unit 303 are moved to the direct storage unit 302 at the time of the CPU 301 executing a program. The indirect storage unit 303 is configured of ROM (Read Only Memory), SSD, HDD, or the like. The external interface 305 is connected to the networks 107, 108, or the like, and may communicate with other apparatuses connected to these networks.

While description of the image forming apparatus 104 and information processing device 106 has been divided, the information processing device 106 may have a power source control unit 210, and also the image forming apparatus 104 functions as an information processing device 106.

Figure 4:
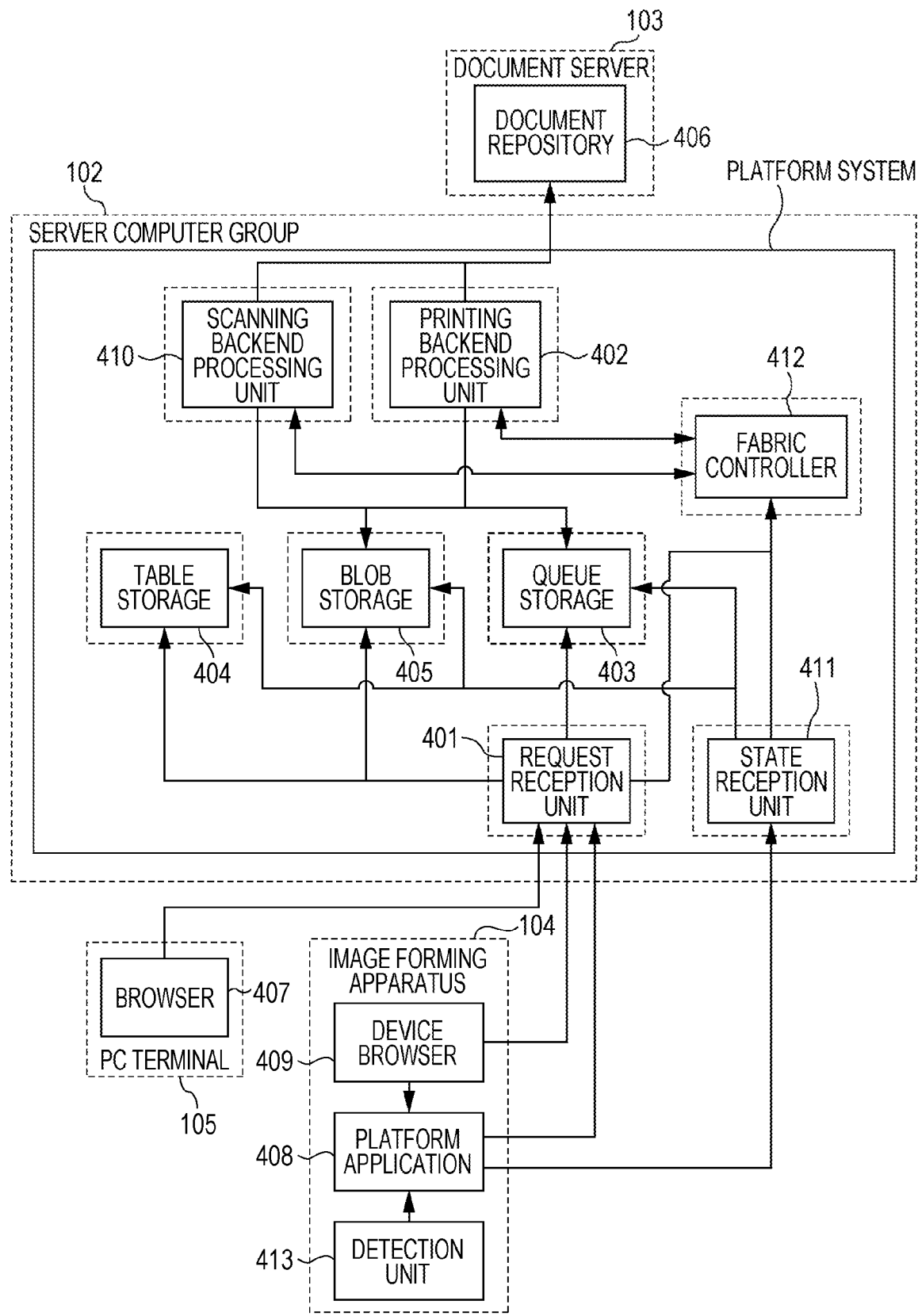
FIG. 4 is a diagram illustrating functions of each apparatus according to an embodiment of the present invention.

Next, the functions which the apparatuses in the network scan/print system according to the present embodiment will be described with reference to FIG. 4. FIG. 4 is a functional block diagram of the apparatuses in the network scan/print system.

First, the function of the server computer group 102 configured of multiple server computers will be described. The server computer group 102 according to the present embodiment is an example of a cloud computing system. The server computer group 102 has the functions of a request reception unit 401, table storage 404, blob storage 405, queue storage 403, and a state reception unit (state acquisition unit) 411. The server computer group 102 has the functions of a printing backend processing unit 402 and a scanning backend processing unit 410 to serve as backend processing units for each of printing and scanning. With the present embodiment, there exists at least one server computer which has a request reception unit 401, and at least one server computer which has a state reception unit 411. Also, there exists at least one server computer which has a printing backend processing unit 402 and at least one server computer which has a scanning backend processing unit 410. Further, there exists at least one server computer which has a each of the functions of table storage 404, blob storage 405, and queue storage 403. Having the above-described functions each on different server computers poses no problem. Note that as described later, the state reception unit 411 receives information to identify transition of the state of the request reception unit 401, and functions as an adjusting unit to adjust increase/decrease of backend processing units 402 and 410 serving as resources. Thus, it can be said that the state reception unit 411 functions as an adjusting device.

The request reception unit 401 provides the function of accepting processing commissioning sent from the PC terminal 105 or image forming apparatus 104.

The printing backend processing unit 402 provides the function of performing processing as to processing commissioning by executing a processing program. Specifically, the printing backend processing unit 402 loads processing programs to the direct storage unit of the server computer executing the printing backend processing, and performs processing.

The scanning backend processing unit 410 provides the function of performing processing as to processing commissioning by executing a processing program. Specifically, the scanning backend processing unit 410 loads processing programs to the direct storage unit of the server computer executing the scanning backend processing, and performs processing.

The state reception unit 411 provides the function of accepting state information sent from the image forming apparatus 104.

The fabric controller 412 provides the function of managing the request reception unit 401, the state reception unit 411, the printing backend processing unit 402, and the scanning backend processing unit 410. Details of this function will be described later with reference to FIG. 5.

The request reception unit 401 is realized by a request reception program stored in the indirect storage unit 303 in FIG. 3 being loaded to the direct storage unit 302 and executed by the CPU 301.

The printing backend processing unit 402 is realized by a printing backend processing program stored in the indirect storage unit 303 in FIG. 3 being loaded to the direct storage unit 302 and executed by the CPU 301.

The scanning backend processing unit 410 is realized by a scanning backend processing program stored in the indirect storage unit 303 in FIG. 3 being loaded to the direct storage unit 302 and executed by the CPU 301.

The state reception unit 411 is realized by a state reception program stored in the indirect storage unit 303 in FIG. 3 being loaded to the direct storage unit 302 and executed by the CPU 301.

The fabric controller 412 is realized by a fabric controller program stored in the indirect storage unit 303 in FIG. 3 being loaded to the direct storage unit 302 and executed by the CPU 301.

The table storage 404 provides the function of performing storage/reference of data such as a correlation table of resources corresponding to the image forming apparatus 104 (resource table). The table storage 404 is realized by a table storage program stored in the indirect storage unit 303 in FIG. 3 being loaded to the direct storage unit 302 and executed by the CPU 301. Also, data is kept in the indirect storage unit 303.

The blob storage 405 provides the function of saving various types of data including data of execution results processed by the printing backend processing unit 402. The blob storage 405 is realized by a blob storage program stored in the indirect storage unit 303 in FIG. 3 being loaded to the direct storage unit 302 and executed by the CPU 301. Also, data is kept in the indirect storage unit 303.

The queue storage 403 provides the following function. One is providing the function of the request reception unit 401, printing backend processing unit 402, and scanning backend processing unit 410 communicating data asynchronously. A second is providing the function of making queue messages added to a queue visible or invisible. Note that a queue is a storage function realized by the queue storage 403, and is realized by a list storage called FIFO (First In First Out).

The first function will be described. The request reception unit 401, printing backend processing unit 402, and scanning backend processing unit 410 communicate as follows. First, the request reception unit 401 which has been commissioned by the user to perform processing creates a ticket called a queue message in accordance with processing commissioning from a user. The queue message is stored in the queue by the request reception unit 401. The printing backend processing unit 402 or scanning backend processing unit 410 acquire the queue message from the queue. The printing backend processing unit 402 or scanning backend processing unit 410 acquire the queue message, reference the queue message, and process the processing commissioning from the user. Thus, the processing commissioning from the user is executed. Thus, the request reception unit 401, printing backend processing unit 402, and scanning backend processing unit 410 may communicate asynchronously by using the queue storage 403. Further detailed description of the first function, and the second function, will be described later. The queue storage 403 is realized by a queue storage program stored in the indirect storage unit 303 in FIG. 3 being loaded to the direct storage unit 302 and executed by the CPU 301. Also, data is kept in the indirect storage unit 303.

The above has been description of the function of the server computer group 102. Further details will be described later.

Next, the function of the document server 103 will be described. The document server 103 has the function of a document repository 406. The document repository 406 is realized by the indirect storage unit 303 in FIG. 3. The document repository 406 has saved therein contents regarding which printing instructions have been given by the user from the PC terminal 105 or image forming apparatus 104. The contents saved in the document repository 406 include, in addition to contents saved beforehand, contents such as follows.

The contents are contents created by the user with an application on the server computer group 102 via a browser 407 which the PC terminal 105 has. Thus, even contents created using an application on the server computer group 102 may be easily printed without installing an application to the PC terminal 105. Note that applications on the server computer group 102 mentioned above are various types of applications including document creating applications, image creating applications, form control applications, and so forth. These applications are held in the indirect storage unit 303 in FIG. 3, and upon execution thereof being instructed, are loaded to the direct storage unit 302 and executed by the CPU 301.

Next, the image forming apparatus 104 will be described in detail. The image forming apparatus 104 has the function of a device browser 409 and platform application 408. The device browser 409 has the function of enabling the user to view data and information saved in devices connected via the network 108.

The device browser 409 is realized by a device browser program saved in the indirect storage unit 206 in FIG. 2 being loaded to the direct storage unit 205 and executed by the CPU 204. Also, the user may give content printing instructions and paper original read instructions using the device browser 409. The device browser 409 is, for example, a Web browser.

The platform application 408 has the function of providing various types of services. The platform application 408 is realized by an application program running on the platform. In the embodiments of the present invention, the platform application 408 provides the service of printing software, reading software, and state monitoring software.

The service which the printing software provides is to transmit printing data which the platform application 408 has received to firmware, and instruct the firmware to perform printing at a printing unit. Also, this services makes confirmation at the request reception unit 401 of whether or not generation of printing data has ended. At this time, this service performs confirmation of generating based on a blob URI which the request reception unit 401 has created.

The service which the reading software provides is to perform original reading instructions to firmware at the reading unit, and receive the original image that has been read in. Also, this service may transmit the received original image data to the request reception unit 401.

The service which the state monitoring software provides is to catch information relating to the state of the image forming apparatus 104 (state event) which has occurred within the image forming apparatus 104, and transmit the contents of the state event and a device ID which uniquely identifies the image forming apparatus 104 to the state reception unit 411. We will say that the device ID is stored in the indirect storage unit 206.

A detection unit 413 has the function of detecting change in the state of the image forming apparatus 104, and issuing a state event based on the detected information to the platform application 408. With the present embodiment, this detection unit 413 is configured of the CPU 204 which executes programs such as start-up processing, the power source control unit 210, and a consumables management unit and the like. Note that the components making up the detection unit 413 are not restricted to these.

Next, the PC terminal 105 will be described in detail. The PC terminal 105 has the function of a browser 407. The browser 407 has the function of enabling the user to view data and information within devices connected via the network 108 or saved in the document server 103. This is realized by a browser program saved in the indirect storage unit 303 in FIG. 3 being loaded to the direct storage unit 302 and executed by the CPU 301. The browser 407 is, for example, a Web browser.

The above has been description of the function of the apparatuses in the network scan/print system according to the present embodiment.

Figure 5:
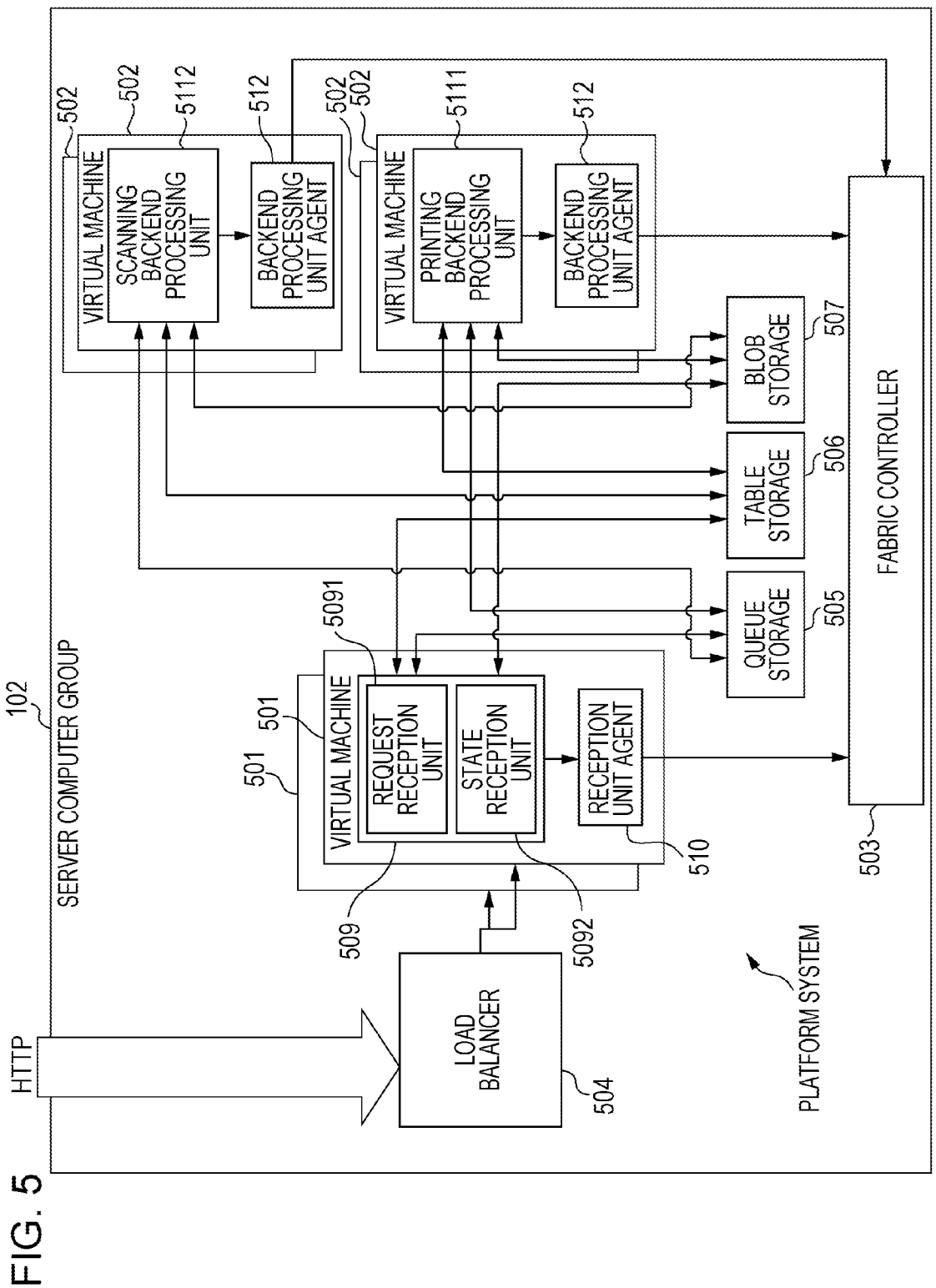
FIG. 5 is a diagram illustrating the details of a platform system according to an embodiment of the present invention.

FIG. 5 is an example of a platform system which the server computer group 102 provides. This platform system is realized by the CPUs 301 of the servers making up the server computer group 102 executing control programs stored in the indirect storage unit 303 using the direct storage unit 302 as a temporary storage region. Also, this platform system uses the indirect storage unit 303 as storage region as well. The user of the platform may use physical hardware resources within the server computer group 102 as resources.

The platform system of the server computer group 102 has the function of virtual machines 501 and 502, a fabric controller 503, a load balancer 504, queue storage 505, table storage 506, and blob storage 507.

There are multiple virtual machines 501 and 502 within the platform system running on the server computer group 102 according to the present embodiment. Alternatively, an arrangement may be made where there is just one virtual machine 501. A virtual machine is a logical computer where a physical server computer group 102 is divided into logical computers by virtualization technology, so as to run in a part of the divided server computer group 102 with an independent operating system. The name of the increment by which such logical computers are counted is "instance", with increasing instances being referred to "starting up a virtual machine" and reducing instances being referred to as "shutting down a virtual machine". Each instance has a unique instance ID. With the present embodiment, one server computer within the server computer group 102 is appropriated to one instance (i.e., one virtual machine), but one server computer may be appropriated to multiple instances.

The virtual machine 501 has a reception unit 509 including a request reception unit 5091 and state reception unit 5092, and a reception unit agent 510. The request reception unit 5091 corresponds to the request reception unit 401 in FIG. 4, and receives processing commissioning from the user via the later-described load balancer 504. Also, the request reception unit 5091 transmits processing commissioning to the backend processing unit via the queue storage 505. The state reception unit 5092 corresponds to the state reception unit 411 in FIG. 4, and receives information relating to the state of the image forming apparatus 104 (state event) via the later-described load balancer 504. Also, the state reception unit 5092 transmits processing commissioning based on received state events to the backend processing unit via the queue storage 505.

In order to ensure high usability of the reception unit 509, requests from external networks (communication by HTTP here) are made via the load balancer 504 which is outside of the virtual machine 501. The load balancer 504 centrally manages requests from the external network and selectively transfers requests to multiple virtual machines having functions equivalent to the reception unit 509. The reception unit agent 510 collects various types of information including the usage state of the virtual machine 501, and the operating state of the reception unit 509 and errors thereat, and periodically transmits this to the fabric controller 503. With the present embodiment, the request reception unit 5091 and state reception unit 5092 have been provided on the same virtual machine 501, but these functions may be provided to separate virtual machines 501. In this case, the one virtual machine may have the request reception unit 5091 and the reception unit agent 510 which monitors it, and the other virtual machine have the state reception unit 5092 and the reception unit agent 510 which monitors it.

There are two types of virtual machine 502 with the present embodiment, with one being a virtual machine having a printing backend processing unit 5111 and a backend processing unit agent 512, and the other being a virtual machine having a scanning backend processing unit 5112 and backend processing unit agent 512. Unless particularly instructed, the printing backend processing unit 5111 and scanning backend processing unit 5112 will not be distinguished, and will be simply referred to as "backend processing unit".

The backend processing unit receives processing commissioning from the request reception unit 5091 via the queue storage 505. The backend processing unit also executes the processing commissioning received from the request reception unit 5091 via the queue storage 505. Also, the backend processing unit scales out. Scaling out means to increase the virtual machines 502 so that the instances of the backend processing unit increases. Increasing the instances of the backend processing unit boosts the data processing capabilities of the backend processing unit. Thus, the results as to the processing commissioning from the user may be returned more speedily. The backend processing unit agent 512 collects various types of information regarding the usage state of the virtual machine 502, the operation state of the backend processing unit, and errors of the backend processing unit, and periodically transmits to the fabric controller 503. Note that the printing backend processing unit 5111 and scanning backend processing unit 5112 on the virtual machine 502 respectively correspond to the printing backend processing unit 402 and scanning backend processing unit 410 shown in FIG. 4. The virtual machine 502 is realized by a backend processing program, and the various functions of the virtual machine 502 are under control of the backend processing program. Note that with the present embodiment, the functions of the printing backend processing unit 5111 and scanning backend processing unit 5112 have been provided on separate virtual machines 502, but an arrangement may be made where the printing backend processing unit 5111 and scanning backend processing unit 5112 are on the same virtual machine 502.

The fabric controller 503 corresponds to the fabric controller 412 shown in FIG. 4. The fabric controller 503 manages the reception unit 509 and instances of the backend processing unit. Thus, expandability and usability of the instances is guaranteed. For example, let us say that a particular instance at the reception unit 509 or backend processing unit stops due to server failure. In this case, the fabric controller 503 may not receive periodic notification from the reception unit agent 510 or backend processing unit agent 512. The fabric controller 503 which may no longer receive periodic notifications gives the new virtual machine instructions to turn over processing to a new instance. That is to say, the new virtual machine functions as a replacement for the virtual machine which may not start up due to failure or like phenomenon. As a result, the number of instances executing the processing is maintained constant, so delay in processing may be suppressed. For example, in the event of scaling out the backend processing unit, the fabric controller 503 is instructed from the reception unit 509 to increase the number of instances of the backend processing unit, whereby new instances are secured and the backend processing program is executed with these instances, thereby realizing scaling out.

The queue storage 505 corresponds to the queue storage 403 in FIG. 4, and provides services for the reception unit 509 and the backend processing unit communicating data asynchronously. The reception unit 509 and backend processing unit give various types of instructions to the queue storage 505 so as to communicate data asynchronously. This will be described in detail. The instruction which the reception unit 509 gives to the queue storage 505 is additional instruction (e.g., insertion) of a queue message 600. The instruction which the backend processing unit gives to the queue storage 505 is acquisition instruction of a queue message 600 and deletion instruction of a queue message 600.

The series of operations for the reception unit 509 and the backend processing unit to perform data communication asynchronously will be described. The reception unit 509 creates a queue message 600 corresponding to processing commissioning from the user, and transmits an addition instruction to the queue storage 505 so that the queue message 600 will be added to the queue. The backend processing unit gives an acquisition instruction by polling the queue storage 505 to acquire the queue message 600. The queue storage 505 which has received the acquisition instruction returns the queue message 600 and the message ID assigned uniquely to each queue message 600 to the backend processing unit as a response to the acquisition instruction. The message ID is unique information assigned to each queue message 600 so as to uniquely identify each queue message 600, and is used by the backend processing unit following the processing to give a deletion instruction of the queue message 600. Upon completing the processing commissioning, the backend processing unit gives a deletion instruction for the queue message corresponding to the message ID to the queue storage 505. The queue storage 505 which has received the deletion instruction deletes the queue message 600 corresponding to the message ID which the backend processing unit has instructed from the queue. Accordingly, the redundant processing of a backend processing unit other than the backend processing unit which has given the deletion instruction performing the processing of deleting the same queue message 600 may be avoided.

Also, the queue storage 505 has the function of making queue messages added to the queue individually visible or invisible. Invisible means that, in the case of the backend processing unit requesting acquisition of the queue message 600 added to the queue, the queue storage 505 not handing the queue message 600 to the backend processing unit. Upon the backend processing unit acquiring the queue message 600 from the queue storage 505, the acquired queue message 600 is made invisible by the queue storage 505. Visible means that, in the case of the backend processing unit requesting acquisition of the queue message 600 added to the queue storage, the queue storage 505 handing the queue message 600 to the backend processing unit. In the event that a queue message 600 has been made invisible due to being acquired by the backend processing unit but no processing results are returned from the backend processing unit performing the processing for a predetermined amount of time, the queue message 600 is made visible by the queue storage 505. Thus, even in cases wherein the backend processing unit has quit unexpectedly and may not continue processing, the processing is automatically re-executed.

The table storage 506 corresponds to the table storage 404 in FIG. 4, and is storage used for saving data. The table storage 506 saves data in a simple form where an entity and type information property are combined.

The blob storage 507 corresponds to the blob storage 405 in FIG. 4, and is storage used for storing data. The blob storage 507 provides the function of saving sets of binary data.

Figure 7:
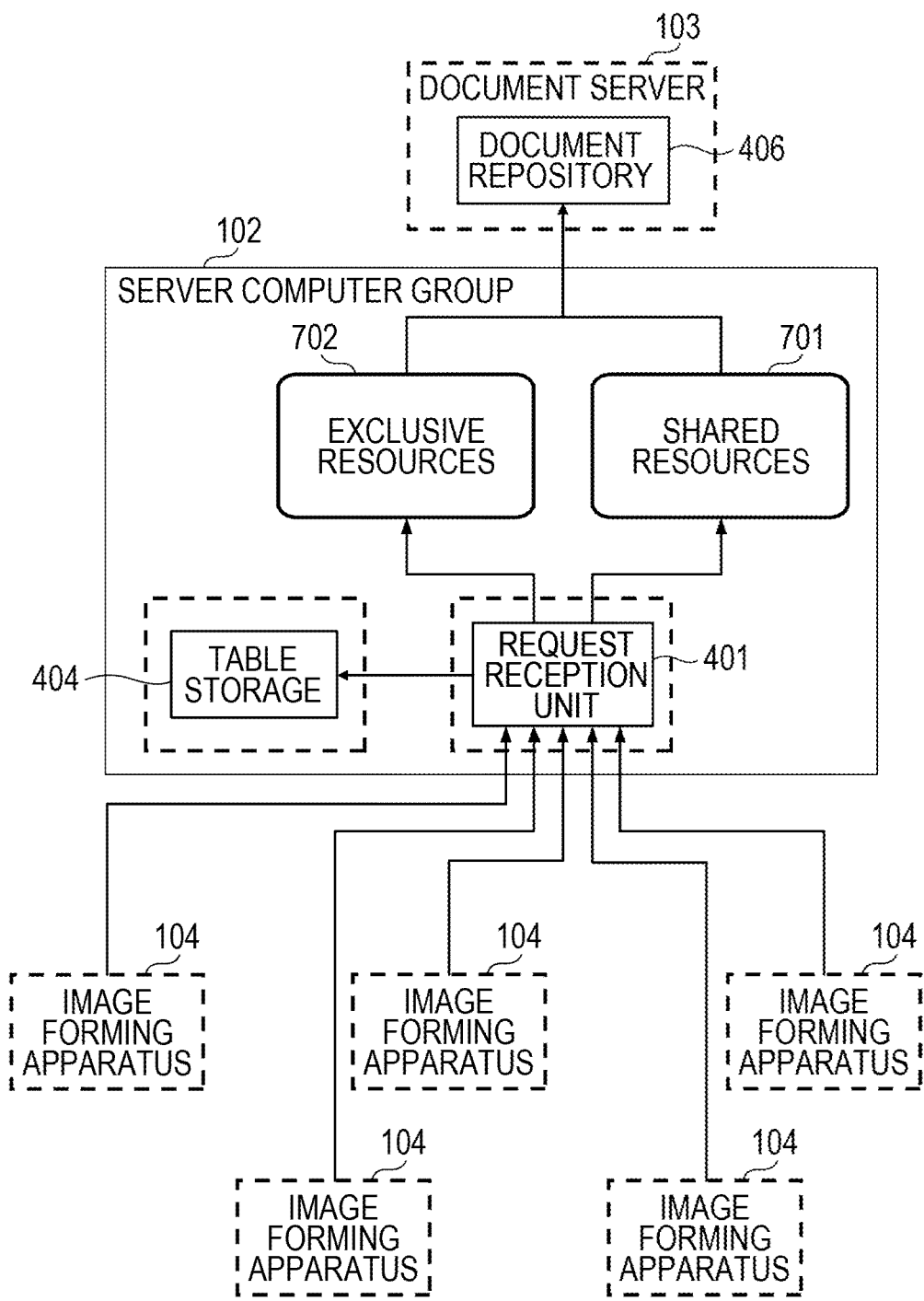
FIG. 7 is a diagram illustrating a resource model according to an embodiment of the present invention.

Next, the resource model according to the present embodiment will be described with reference to FIG. 7. There are two types of resources described in the present embodiment, which are computer resources and storage resources. Computer resources are resources which process jobs. Computer resources as referred to in the present embodiment mean the virtual machine 502 performing as the printing backend processing unit 402 and scanning backend processing unit 410. The term "computer resources being exclusively possessed" means a state in which the virtual machine 502 only processes requests from a particular image forming apparatus 104.

Also, storage resources mean the data held by the blob storage 405 and the holding location of the data (later-described container). In the present embodiment, if the term "resource" is simply used as such, this is understood to include both computer resources and storage resources.

With the client-server system according to the present embodiment, two types of resource models coexist. The first is a shared resource model, which is a model where a group of resources are shared by multiple image forming apparatuses 104. The resources in this model are referred to as "shared resources". With this model, in the event that multiple image forming apparatuses exist as shown in FIG. 7, the requests thereof are accepted at the request reception unit 401, and subsequent processing is equally handled by a group of resources secured as shared resources 701, not dependent on the image forming apparatus 104. A feature of the present model is that processing from image forming apparatuses 104 which are not uniform in usage frequency may be processed together, so the processing amount may be equalized, and processing may be handled with fewer resources as compared to a case of each image forming apparatus 104 exclusively possessing and securing resources necessary for itself. Note however, that this is based on a presumption that the usage frequency of the multiple image forming apparatuses 104 is not uniform, so in the event that many image forming apparatuses 104 attempt to execute processing at the same time, resources for performing processing will be insufficient, and performance will suffer.

Another model is the exclusive resource model, which is a model where a particular image forming apparatus 104 exclusively possesses a group of resources. The resources of this model are referred to as "exclusive resources". In the event that just one of the multiple image forming apparatuses 104 shown in FIG. 7 employ this model, after the request reception unit 401 accepts a request thereof, subsequent processing is exclusively processed by exclusive resources 702 exclusively possessed by this image forming apparatus 104 in this model. A feature of the exclusive resource model is that even in the event that multiple image forming apparatuses 104 other than the particular image forming apparatus 104 request processing at the same time, resources exclusively possessed execute the processing for processing requests from the particular image forming apparatus 104, so constant performance may be maintained. However, in the event that the particular image forming apparatus 104 does not request processing, the resources are hoarded and become idle resources.

Next, the queue message 600 according to embodiments of the present invention will be described. FIGS. 6A through 6D are diagrams illustrating examples of queue messages 600, with FIG. 6A being an example of printing, 6B scanning, 6C change in computer resource appropriation, and 6D deletion of computer resources. The queue message 600 is a description of the contents of processing which the request reception unit 5091 commissions the backend processing unit to perform in response to processing commissioning from the image forming apparatus 104.

A request 601 indicates the location of the queue storage 505 to which the queue message is to be added. A header 602 transmits authentication information and the like of accessing the queue storage 505. The authentication information here is a hash value of a character string necessary for using the queue storage 505. The queue storage 505 reads in this header information and compares with a character string held within itself to perform authentication processing, so as to determine whether or not to accept the queue message 600 including this header.

Next, description will be made regarding the message data content portions 603, 604, 605, and 606 of the queue message 600. The message data content portions 603, 604, 605 and 606 are determined in accordance with processing commissioning from the user and event notification from the image forming apparatus 104.

With regard to the message data content portion 603 in FIG. 6A, <MessageText> includes a <Type> portion indicating the message type of the queue message 600, a <BlobURI> portion indicating a blob URI, and a <DocId> portion indicating the document ID. In the case in FIG. 6A, the message type is "PRINT", the blob URI is "http://print-sv.blob.net/device3/folder/file.doc", and the document ID is "folder/file.doc". The blob URI is unique information created in response to the processing commission from the user.

With regard to the message data content portion 604 in FIG. 6B, <MessageText> includes a <Type> portion indicating the message type of the queue message 600, a <BlobURI> portion indicating a blob URI, and a <DocId> portion indicating the document name. In the case in FIG. 6B, the message type is "SCAN", the blob URI is "http://scan-sv.blob.net/device3/folder/file.doc", and the document ID is "folder/file.doc". The blob URI is unique information created in response to the processing commission from the user.

With regard to the message data content portion 605 in FIG. 6C, <MessageText> includes a <Type> portion indicating the message type of the queue message 600 and a <Queue> portion indicating the queue storage URI. In the case in FIG. 6C, the message type is "MOVE", and the queue storage URI is "http://print-sv.queue.net/global/".

With regard to the message data content portion 606 in FIG. 6D, <MessageText> includes a <Type> portion indicating the message type of the queue message 600. In the case in FIG. 6D, the message type is "KILL".

Next, a resource table in the present embodiment will be described with reference to FIG. 8. The resource table 800 holds, in a correlated manner, a device ID uniquely identifying the image forming apparatus 104, and addresses of the queue storage 505 and blob storage 507 used at the time of processing requests from that image forming apparatus 104. The resource table 800 is held in the table storage 506.

FIG. 8 is a diagram illustrating an example of the resource table 800 actually held. A tag (ETag) 801 is a value automatically set to the resource table 800 by the backend processing unit and state reception unit 411, and a unique value is written thereto when row data is updated. In the event that the value of the tag 801 at the time of data acquisition and the value of the tag 801 at the time of data updating differ when updating the data acquired from the resource table 800, the fact that the table has been updated by another processing process may be recognized.

A partition key (PartitionKey) 802 and row key (RowKey) 803 may uniquely identify rows of the table. With the resource table 800, the value of the row key 803 is managed as a device ID.

The print queue URI (Print Queue URI) 804 is where the URI of the queue storage 403, used for the printing backend processing unit 402 to acquire a queue message 600 at the time of the printing backend processing unit 402 executing a print job, is stored.

The scan queue URI (Scan Queue URI) 805 is where the URI of the queue storage 403, used for the scanning backend processing unit 410 to acquire a queue message 600, is stored.

The print container URI (Print Container URI) 806 is where the URI of the container, provided within the blob storage 405 used for hading data from the printing backend processing unit 402 to the request reception unit 401 at the time of processing a print request, is stored.

The scan container URI (Scan Container URI) 807 is where the URI of the container, provided within the blob storage 405 used for hading data from the request reception unit 401 to the scanning backend processing unit 410 at the time of processing a scan request, is stored.

The device type (Device Type) 808 is for identifying which of the exclusive resource model and shared resource model is applied for the image forming apparatus 104 identified by the device ID in the row key 803. An image forming apparatus 104 the value of the device type 808 is "special" is an image forming apparatus regarding which the exclusive resource model is applied, and a device which is "global" is an image forming apparatus regarding which the shared resource model is applied.

The URI structures in the URIs 804, 805, 806, and 807 in FIG. 8 have a format of base address+target identifier. For example, with the print queue URI 804 in FIG. 8, the base address is "http://print-sv.queue.net/". As for the target identifier, there are a global identifier and individual device identifier, with the global identifier being the character string "global", while the individual device identifier being the device ID itself. Accordingly, with the print queue URI 804, the global URI is "http://print-sv.queue.net/global/", and the device-unique URI of the device of which the device ID is "device3" is "http://print-sv.queue.net/device3/". An image forming apparatus 104 regarding which a global URI is specified is of a configuration to use shared resources. In the event that a device-unique URI is specified, the image forming apparatus 104 to which that device ID has been assigned is of a configuration to use exclusive resources.

Figure 9:
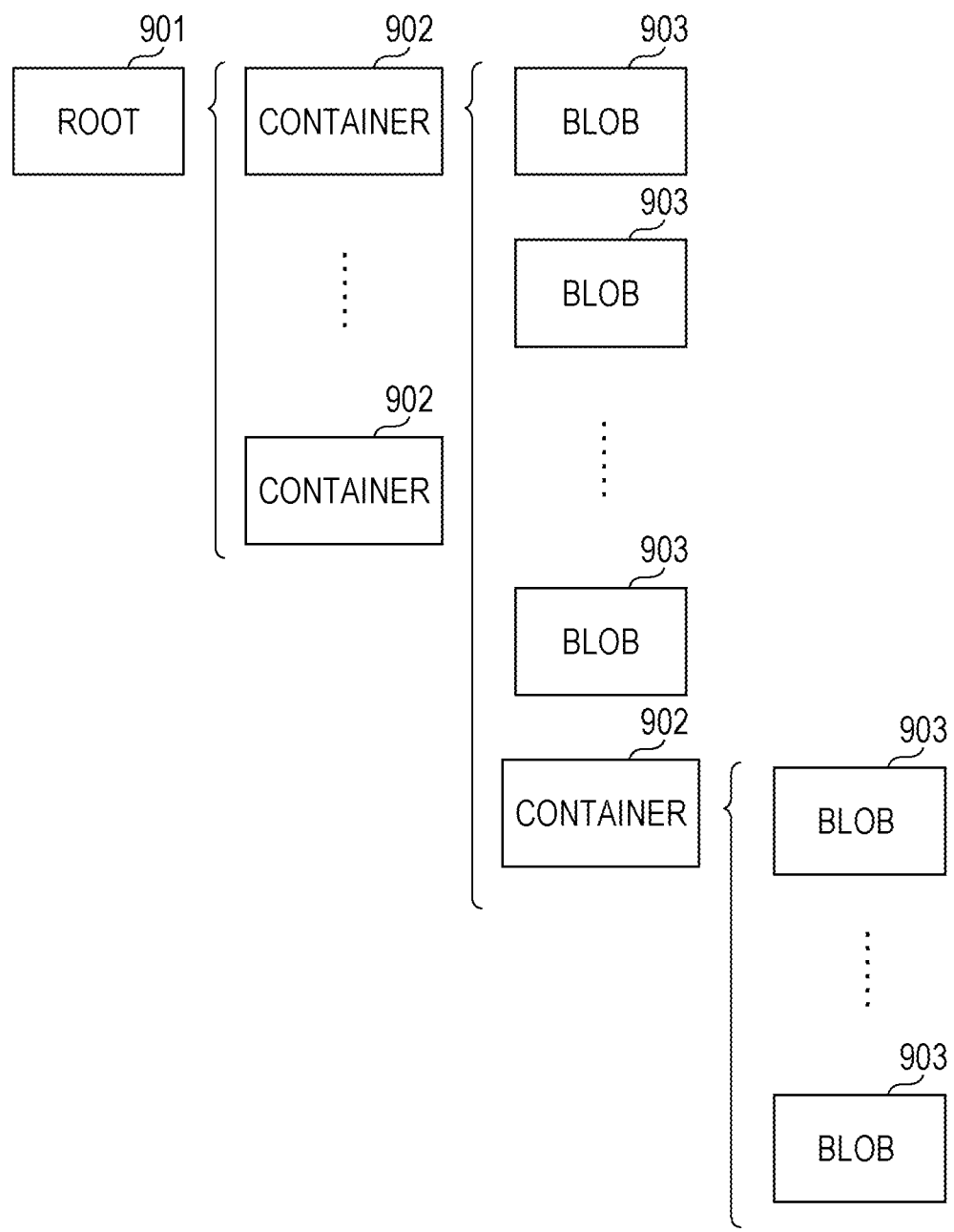
FIG. 9 is a diagram illustrating a data distribution structure within blob storage according to an embodiment of the present invention.

Next, the data distribution structure within the blob storage 507 according to the present embodiment will be described with reference to FIG. 9. The data distribution structure within the blob storage 507 is a hierarchical structure. With the highest element being a root element 901.

The root element 901 is assigned a base URI such as "http://print-sv.blob.net", for example. Also, the root element 901 may have multiple containers 902 beneath itself. The URI of a container 902 is a character string created by joining the URI of the higher order element and the container name with a slash "/". For example, the URI of a container 902 with a name "global" that is under the root element 901 with the base URI of "http://print-sv.blob.net" will be "http://print-sv.blob.net/global". The container 902 may have multiple blobs 903 and containers 902 under itself, and in the event of deleting a container 902, all blobs 903 and containers 902 underneath it are also deleted in batch fashion.

A blob 903 represents binary data, such as a file or the like. The URI of a blob 903 is a character string created by joining the URI of the higher order element and the blob name with a slash "/". For example, the address of a blob 903 of a name "document1.doc" underneath a container 902 having an URI of "http://print-sv.blob.net/global" would be "http://print-sv.blob.net/global/document1.doc".

Figure 10B:
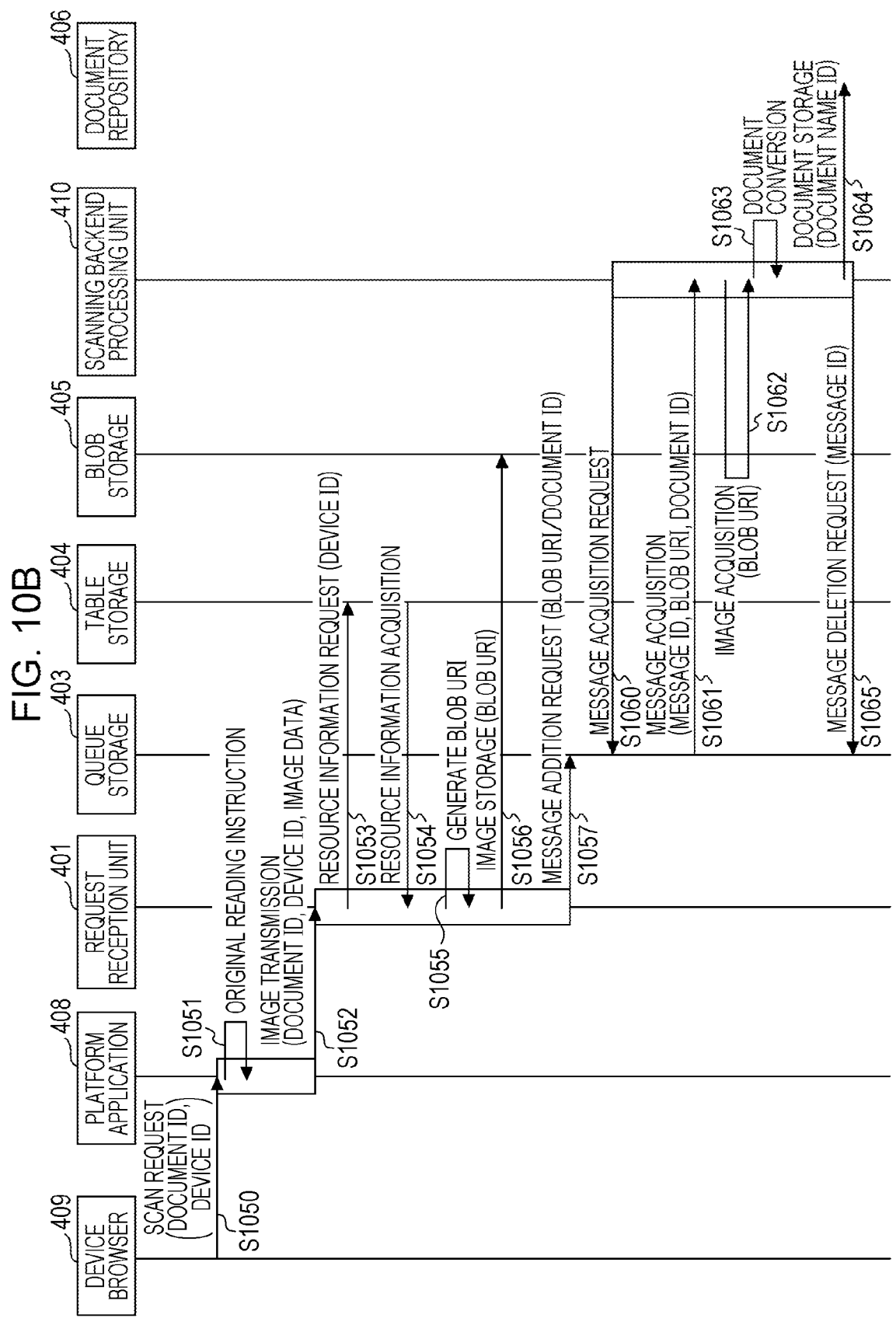

Next, the flow of processing following a print request or scan request according to the present embodiment will be described with reference of FIGS. 10A and 10B. First, the printing processing according to the present embodiment will be described with reference to FIG. 10A. FIG. 10A is a sequence diagram representing the flow of printing processing.

The series of processing starts by a user giving a print request at the device browser 409 of the image forming apparatus 104. The device browser 409 communicates with a printing application running at the request reception unit 401 to perform printing processing.

Figure 11A:
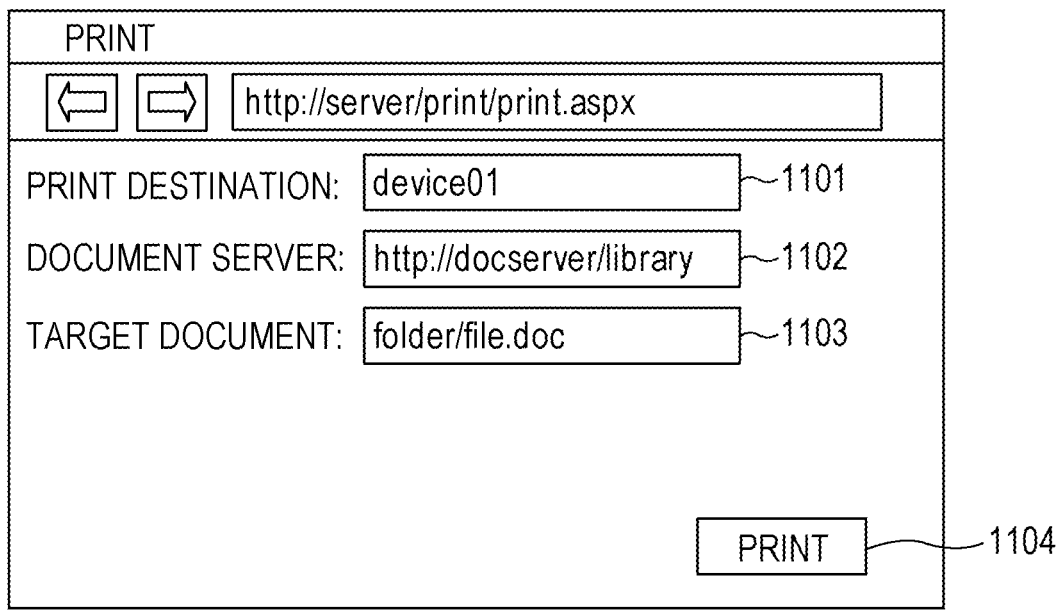
FIGS. 11A and 11B are diagrams illustrating a printing data selection screen with a print application and a storage destination selection screen with a scan application, according to an embodiment of the present invention.

FIG. 11A is an example of a printing screen displayed at the device browser 409. This screen is generated by the printing application running at the request reception unit 401.

The device ID of the image forming apparatus 104 which the user is currently operating is displayed at a printing destination space 1101. The URL of the document server from which data is to be acquired is displayed at a document server space 1102. With the present embodiment, this URL is included in the program of the printing application running at the request reception unit 401. The document ID of the document to actually be printed is input by the user to the target document space 1103. With the example in this drawing, a document called "folder/file.doc" is to be printed. A print button 1104 is a button displayed on the display browser, and upon the user pressing this, the sequence of the series of printing processing described below is executed.

Upon the print button 1104 being pressed, the device browser 409 makes a print request to the request reception unit 401 in operation S1001. This print requests hands the document ID input to the target document space 1103 and the device ID displayed on the printing destination space 1101, as parameters.

The request reception unit 401 which has accepted the request performs an acquisition request for resource information as to the resource table 800 in the table storage 404 in operation S1002. In the resource information acquisition request, the device ID is handed over as a parameter. The table storage 404 in operation S1003 responds to the request reception unit 401 with the resource information corresponding to the device ID regarding which the request has been made. The request reception unit 401 which has acquired the resource information generates in operation S1004 a blob URI by joining the information of the print container URI 806 and the document ID. The request reception unit 401 in operation S1005 makes an addition request of the queue message 600 to the queue storage 403. Now, the addition destination of the queue message 600 is the print queue URI acquired in operation S1003. In this addition request for the queue message 600, a queue message 600 including the blob URI generated in operation S1004 and the document ID received in operation S1001, and "PRINT" which indicates printing as the message type of the queue message 600, is created and handed over. The queue storage 403 performs addition processing of the queue message 600. The request reception unit 401 performs acquisition of the blob URI to the device browser 409 in operation S1006 as a response to the request in operation S1001.

Next, processing of the platform application 408 acquiring printing data will be described. In operation S1020, the device browser 409 which has acquired the blob URI in operation S1006 gives a monitoring instruction to the platform application 408. In the monitoring instruction, the blob URI is handed to the platform application 408 as a parameter. The platform application 408 in operation S1021 gives a printing data request to the request reception unit 401. In the printing data request, the blob URI is handed over as a parameter.

The request reception unit 401 makes in operation S1022 a printing data acquisition request to the blob storage 405. In the printing data acquisition request, the blob URI received in operation S1021 is handed over as a parameter. The blob storage 405 searches for a blob matching the specified blob URI, and response to the request reception unit 401. With the present embodiment, there is no blob matching the blob URI specified at the time of the printing data acquisition request in operation S1022, so as a response in operation S1022, the request reception unit 401 receives a no document response in operation S1023. In operation S1024 the request reception unit 401 makes a no printing data response to the platform application 408.

The platform application 408 repeatedly makes printing data requests to the request reception unit 401 until the printing data is acquired. The printing data request in operation S1025 is the repeated request, and along with the processing of the printing data acquisition request in operation S1026 and the printing data acquisition in the S1027 is the same processing as with operations S1021, S1022, and S1023. Note however, that the point of operation S1026, the blob of the specified blob URI has already been created, so in operation S1027 the blob storage 405 returns the printing data to the request reception unit 401 as a response. In operation S1028, the request reception unit 401 hands over the printing data as a response to operation S1025. The platform application 408 performs printing instruction with printing software using the acquired printing data in operation S1029, so printing is executed at the image forming apparatus 104. Thus, a printed article is obtained.

Next, the flow of the printing backend processing unit 402 acquiring document data to be printed from the document repository 406 of the document server 103, up to converting this to printing data and storing in the blob storage 405, will be described.

The printing backend processing unit 402 polls the queue storage 403 to periodically perform message acquisition requests in operation S1010. In the event that a queue message 600 from the queue storage 403 is acquired in operation S1011, the printing backend processing unit 402 extracts the message type of the queue message 600. In the event that the message type is PRINT, the blob URI of <BlobURI> and the document ID of <DocID> are also extracted.

The printing backend processing unit 402 gives a document acquisition request to the document repository 406 in operation S1012. In the document acquisition request, the document ID is handed over as a parameter. In the present embodiment, we will say that the URL of the document repository 406 is described in the program of the printing backend processing unit 402. The document repository 406 which has received the document acquisition request in operation S1012 responds with the document data of the specified document ID in operation S1013. The printing backend processing unit 402 performs conversion processing of the document data acquired in operation S1013 into printing data in operation S1014. In operation S1015, the printing backend processing unit 402 saves the printing data obtained by conversion in operation S1014 to the blob URI specified in operation S1011.

The printing backend processing unit 402 deletes the queue message 600 processed by the queue storage 403 in the message deletion request made in operation S1016. Thus, the queue message 600 corresponding to the job that has been processed is deleted from the queue storage 403, and re-execution processing due to timeout will not be performed.

Description of printing processing according to the present embodiment has been made above. Next, description of reading (scan) processing according to the present embodiment will be made with reference to FIG. 10B. FIG. 10B is a sequence diagram representing the flow of reading processing according to the present embodiment.

The series of processing starts by a user giving a scan request at the device browser 409 of the image forming apparatus 104. The device browser 409 communicates with a scanning application running at the request reception unit 401 to perform reading processing.

Figure 11B:
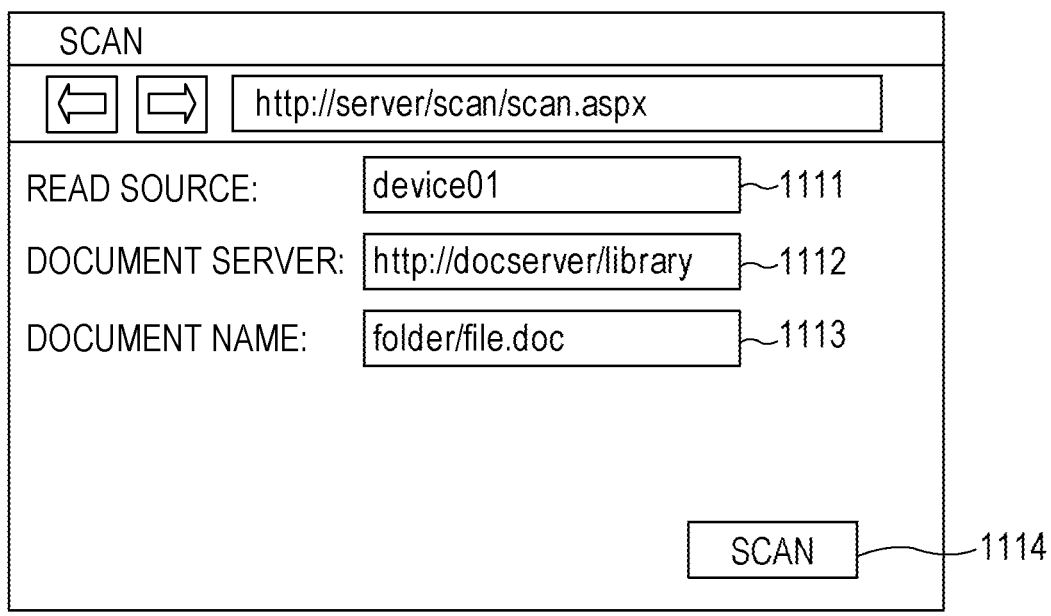

FIG. 11B is an example of a screen displayed at the device browser 409. This screen is generated by the scanning application running at the request reception unit 401.

The read source space 1111 displays the device ID of the image forming apparatus 104 which the user is currently operating. The document server space 1112 displays the URL of the document server to store the data. With the present embodiment, this URL is included in the program of the scanning application running on the request reception unit 401. The user inputs the name (document ID) of the scan image data to be stored in the document name space 1113. With the example in this drawing, the document is stored with the name "folder/file.doc". A scan button 1114 is a button displayed on the device browser, and upon the user pressing this, the sequence of the series of scanning processing described below is executed.

Upon the scan button 1114 in FIG. 11B being pressed, the device browser 409 makes a scan request in operation S1050 to the platform application 408. In this scan request, the document ID input to the document name space 1113 and the device ID displayed in the read source space 1111 are handed over as parameters.

The platform application 408 which has received the scan request gives in operation S1051 an original read instruction to the image forming apparatus 104, and receives the image data which the image forming apparatus 104 has read. In operation S1052, the platform application 408 performs image transmission of the image data read in operation S1051 along with the document ID and device ID received in operation S1050 to the request reception unit 401. The request reception unit 401 which has received the image makes a resource information acquisition request in operation S1053 to the resource table 800 of the table storage 404. In the resource information request, the device ID is handed over as a parameter. The table storage 404 responds to the request reception unit 401 in operation S1054 with the resource information corresponding to the requested device ID. The request reception unit 401 which has received the resource information generates a blob URI by joining the information of the Scan Container URI 807 and the document ID in operation S1055. In operation S1056 the request reception unit 401 stores the image data in the blob storage 405 based on the generated blob URI.

Next, the request reception unit 401 in operation S1057 makes an addition request of the queue message 600 to the queue storage 403. Now, the addition destination of the queue message 600 is the scan queue URI acquired in operation S1054. In this addition request for the queue message 600, a queue message 600 including the blob URI generated in operation S1055 and the document ID received in operation S1052, and "SCAN" which indicates scanning as the message type of the queue message 600, is created and handed over. The queue storage 403 performs addition processing of the queue message 600.

Next, the flow up to the scanning backend processing unit 410 storing the image data in the document repository 406 will be described. The scanning backend processing unit 410 polls the queue storage 403 to periodically perform acquisition requests for a queue message 600 in operation S1060. In the event that a message from the queue storage 403 is acquired in operation S1061, the scanning backend processing unit 410 extracts the message type of the queue message 600. In the event that the message type is SCAN, the blob URI of <BlobURI> and the document ID of <DocID> are also extracted.

In operation S1062, the scanning backend processing unit 410 accesses the blob URI obtained in operation S1061, and acquires image data. The acquired image data is subjected to document conversion by the scanning backend processing unit 410 in operation S1063. For example, the image data of bitmap or the like is converted into a format such as PDF or the like.

Next, in operation S1064, the scanning backend processing unit 410 stores the document in the document repository 406. At the time of storing the document, the document ID acquired as a parameter in operation S1061 is specified. The document repository 406 saves the document data specified with the specified document ID.

Next, the scanning backend processing unit 410 deletes the queue message 600 processed by the queue storage 403 in the deletion request for the queue message 600 made in operation S1065. Thus, the queue message 600 corresponding to the job that has been processed is deleted from the queue storage 403, and re-execution processing due to timeout will not be performed. This ends the description of the flow of scanning processing according to the present embodiment.

Next, the structure of the printing backend processing unit 402 will be described with reference to FIG. 12A, and the structure of the scanning backend processing unit 410 with reference to FIG. 12B. A monitoring target address 1202 holds the address of the queue storage 403 from which the printing backend processing unit 402 and the scanning backend processing unit 410 should acquire a queue message 600.

FIG. 12A illustrates the structure of the printing backend processing unit 402. A queue monitoring unit 1201 acquires the address of the queue storage 403 held at the monitoring target address 1202, and repeats acquisition requests of queue messages 600 to the queue storage 403. In the event that the message type of the acquired queue message 600 is PRINT, a document acquisition unit 1203, document conversion unit 1204, and document writing unit 1205 respectively perform document acquisition, document conversion, and document writing, based on the contents of the message which the queue monitoring unit 1201 has acquired.

FIG. 12B illustrates the structure of the scanning backend processing unit 410. A queue monitoring unit 1206 acquires the address held at the monitoring target address 1202, and repeats acquisition requests of queue messages 600 to the queue storage 403. In the event that the message type of the acquired queue message 600 is SCAN, a document acquisition unit 1207, document conversion unit 1208, and document writing unit 1209 respectively perform document acquisition, document conversion, and document writing, based on the contents of the queue message 600 which the queue monitoring unit 1206 has acquired.

In the event that the message type of the acquired queue message 600 is MOVE, the queue monitoring units 1201 and 1206 extract the URI (address) of the queue storage 403 to be newly monitored from the <Queue> in the message data content potion 605 of the queue message 600, and rewrites the address already held in the monitoring target address 1202 with the extracted address such that the extracted address is held therein. This ends description of the structure of the printing backend processing unit 402 and the scanning backend processing unit 410 with reference to FIGS. 12A and 12B.

Now, the flow of processing the event of the image forming apparatus 104 making transition to a power saving state will be described. In the event of making transition to a power saving state, the image forming apparatus 104 is subjected to sleep processing by the power source control unit 210, and a sleep even is issued as a state event of the image forming apparatus 104. The platform application 408 receives this sleep event. The platform application 408 which has received the sleep event makes an event notification to the state reception unit 411. In this event notification, the device ID and an identifier indicating contents of the event (sleep event in this case) are handed as parameters.

The state reception unit 411 which has received the event notification performs processing according to the received event notification, following the determination flow shown in FIG. 16. First, the state reception unit 411 makes reference to the row key 803 of the resource table 800 in the table storage 404 in operation S1601, and searches which image forming apparatus 104 this event notification has been notified from, based on the device ID handed over as a parameter. This search determines whether the device type 808 of the uniquely determined device is "special" (S1601). In the event that the result of determination is that the device type 808 is "special", the state reception unit 411 executes later-described resource adjustment processing (S1602), and if "global", ends processing at that point.

Now, description will be made regarding resource adjustment regarding a case wherein the device type corresponding to the image forming apparatus 104 transitioning to a power saving state is "special", i.e., in the event that an exclusive resource model has been applied to the image forming apparatus 104, with reference to FIG. 13A and FIG. 13B.

At the time of the image forming apparatus 104 making transition to the power saving state, the detection unit 413 issues a sleep event. In operation S1301, the platform application 408 receives this sleep event. The platform application 408 which has received this sleep event performs an event notification to the state reception unit 411 in operation S1302. In the event notification, the device ID and an identifier indicating the contents of the event (here, a sleep event) are handed over as parameters.

The state reception unit 411 which has received the event notification performs a resource information acquisition request as to the resource table 800 of the table storage 404 in operation S1303. In the resource information acquisition request, the device ID is handed over as a parameter. The table storage 404 responds to the state reception unit 411 in operation S1304 with the resource information corresponding to the requested device ID. Now, in operation S1305 the state reception unit 411 requests the resource table 800 of the table storage 404 to convert all resource URIs corresponding to the device ID acquired in operation S1302 (the print queue URI 804, scan queue URI 805, print container URI 806, and scan container queue URI 807) into global URIs. Thus, addition of a queue message 600 in the later-described operations S1328 and S1329 may be performed as to queue URIs which are global URIs.

Next, in operations S1306 and S1307, a queue message 600 is added to the pre-update print queue URI 804 and scan queue URI 805 obtained in operation S1304. The contents of this queue message 600 is such that the message type is MOVE, and the <Queue> portion has been updated in operation S1305 to be a global URI.

In operations S1308 and 1309, container URIs are instructed for each blob storage 405 for printing and for scanning obtained in operation S1304, and the region is deleted.

Next, the instance of the printing backend processing unit 402 polls the queue storage 403 to periodically make an acquisition request for the queue message 600 in operation S1310. In the event that the queue message 600 is acquired from the queue storage 403 in operation S1311, the instance of the printing backend processing unit 402 extracts the message type. In the event that the message type is MOVE, in operation S1312 the instance of the printing backend processing unit 402 extracts the URI of the queue storage 403 which is the destination of polling instructed in the <Queue> portion of the queue message 600, and rewrites the contents held in the monitoring target address 1202.

Next, the instance of the printing backend processing unit 402 deletes the queue message 600 currently processing by the queue storage 403 in the message deletion request in operation S1313. Thus, the queue message 600 corresponding to the job that has been processed is deleted from the queue storage 403, and re-execution processing due to timeout will not be performed. Due to this replacement, the instance of the printing backend processing unit 402 which had been performing polling regarding device-specific URIs now performs polling regarding global URIs, and the instance of the printing backend processing unit 402 which had been an exclusive resource is appropriated as a shared resource. That is to say, the state reception unit 411 performs changes by way of queue messages to cause the printing backend processing unit 402, which has been functioning as an exclusive resource (first resource), to function as a shared resource (second resource). Thus, exclusive resources decrease and shared resources increase.

With operations S1314 through S1317, the instance of the scanning backend processing unit 410 performs the same processing that the instance of the printing backend processing unit 402 has performed in operations S1310 through S1313. Due to this replacement, the instance of the request reception unit 401 which had been performing polling regarding device-specific URIs now performs polling regarding global URIs, and the instance of the scanning backend processing unit 410 which had been an exclusive resource is appropriated as a shared resource. That is to say, the state reception unit 411 performs changes by way of queue messages to cause the scanning backend processing unit 410, which has been functioning as an exclusive resource (first resource), to function as a shared resource (second resource). Thus, exclusive resources decrease and shared resources increase.

Description has been made so far regarding a flow in which, at the time of an image forming apparatus 104 to which an exclusive resource model has been applied making transition to a power saving state, the exclusivity of exclusive resources which the image forming apparatus 104 had exclusively possessed is cancelled and the instances of the printing backend processing unit 402 and request reception unit 401 are appropriated as shared resources.

Next, description will be made regarding the flow in a case where an image forming apparatus 104 to which an exclusive resource model has been applied recovers from a power saving state to a normal state in which image formation operations and image reading operations may be performed. At the state at which operation S1317 in FIG. 13A is executed, the image forming apparatus 104 is in a power saving state, and the instances of the printing backend processing unit 402 and request reception unit 401 are not appropriated to the image forming apparatus 104 as exclusive resources.

At the time of the image forming apparatus 104 to which an exclusive resource model has been applied being recovered from the power saving state to a normal state in which image formation operations and image reading operations may be performed, the detection unit 413 issues a sleep wake-up event. In operation S1321, the platform application 408 receives the sleep wake-up event. In operation S1322, the platform application 408 which has received the sleep wake-up event makes an event notification to the state reception unit 411. In this event notification, the device ID and contents of the event (here, a sleep wake-up event) are handed over as parameters. The state reception unit 411 which has received the event notification makes a resource information acquisition request to the resource table 800 of the table storage 404 in operation S1323. In the resource information acquisition request, the device ID is handed over as a parameter. The table storage 404 responds to the state reception unit 411 in operation S1324 with resource information corresponding to the requested device ID. Now, in operation S1325 the state reception unit 411 requests the resource table 800 of the table storage 404 to change all resource URIs corresponding to the device ID acquired in operation S1322 to device-specific URIs. The table storage 404 executes the requested changes.

Next, in operations S1326 and S1327, the container URIs of the blob storages 405 for printing and for scanning updated in operation S1325 are each specified, with region thereof being created.

In operations S1328 and S1329, a queue message 600 is added to the print queue URI 804 and scan queue URI 805 obtained in operation S1324 before updating. The contents of this queue message 600 is such that the message type is MOVE, and the URI of the queue storage instructed in the <Queue> portion is the device-specific URI changed in operation S1325.

Next, the instance of the printing backend processing unit 402 polls the queue storage 403 to periodically make an acquisition request for the queue message 600 in operation S1330. In the event that the queue message 600 is acquired from the queue storage 403 in operation S1311, the instance of the printing backend processing unit 402 extracts the message type. In the event that the message type is MOVE, in operation S1332 the instance of the printing backend processing unit 402 extracts the URI of the queue storage 403 which is the destination of polling instructed in the <Queue> portion of the queue message 600, and rewrites the contents held in the monitoring target address 1202. Note that the number of instances regarding which the monitoring destination queue URI is updated in operation S1332 is the same number as that of the instances used as exclusive resources at the point of operation S1301.

The instance of the printing backend processing unit 402 then deletes the queue message 600 that has currently been processed from the queue storage 403 by the message deletion request in operation S1333. Thus, the queue message 600 corresponding to the job that has been processed is deleted from the queue storage 403, and re-execution processing due to timeout will not be performed. Due to this replacement, the instance of the printing backend processing unit 402 which had been performing polling regarding global URIs now performs polling regarding device-specific URIs. That is to say, the state reception unit 411 performs changes by way of queue messages to cause the printing backend processing unit 402, which has been functioning as a shared resource (second resource), to function as an exclusive resource (first resource). Thus, exclusive resources increase and shared resources decrease.

With operations S1314 through S1337, the instance of the scanning backend processing unit 410 performs the same processing that the instance of the printing backend processing unit 402 has performed in operations S1330 through S1333. Due to this replacement, the instance of the scanning backend processing unit 410 which had been performing polling regarding global URIs now performs polling regarding device-specific URIs, in the same way as with the instance of the printing backend processing unit 402. That is to say, the state reception unit 411 performs changes by way of queue messages to cause the scanning backend processing unit 410, which has been functioning as a shared resource (second resource), to function as an exclusive resource (first resource). Thus, exclusive resources increase and shared resources decrease.

Description has been made so far regarding a flow from a sleep wake-up event being issued at an image forming apparatus 104 regarding which an exclusive resource model has been applied, up to part of the instances of the printing backend processing unit 402 and scanning backend processing unit 410 appropriated as shared resources being appropriated as exclusive resources exclusively possessed by this image forming apparatus 104.

Due to the present embodiment, a state in which resources are hoarded, regardless of a state in which the apparatus 104 regarding which the exclusive resource model has been applied has gone to a power saving state and neither image forming operations nor image reading operations are executable, may be prevented, and deterioration in usage efficiency of resources may be reduced. Also, the processing efficiency of shared resources may be raised by appropriating the resources regarding which the exclusivity has been cancelled as shared resources. Also, at the time of sleep wake-up of the image forming apparatus 104 to which the exclusive resource model has been applied, the shared resources are re-appropriated as exclusive resources, so the exclusive resources may be re-secured with no loss in time.

Second Embodiment

The resource adjustment described in the first embodiment involves changing allocation of exclusive resources to shared resources by the state reception unit 411 receiving notification of a sleep event of the image forming apparatus 104, so as to alleviate deterioration of the usage efficiency of exclusive resources.

With the present embodiment, exclusive resources are deleted by the state reception unit 411 receiving notification of a sleep event of the image forming apparatus 104. By deleting exclusive resources, i.e., by reducing the number of instances of virtual machines 502 functioning as the backend processing units 402 and 410, prevents deterioration of the usage efficiency of exclusive resources in the event that the image forming apparatus 104 goes to a power saving state.

The present embodiment will be described with reference to FIG. 15. Note that unless particularly noted, the network scan/print system according to the present embodiment is the same as that of the first embodiment.

The following is a description which will be made with reference to FIG. 15 regarding a case in which the device type to which the image forming apparatus 104 making transition to a power saving state is "special", i.e., the exclusive resource model has been applied to the image forming apparatus 104, in the same way as with the description of the first embodiment.

At the time of the image forming apparatus 104 making transition to the power saving state, the detection unit 413 issues a sleep event. In operation S1501, the platform application 408 receives this sleep event. The platform application 408 which has received this sleep event performs an event notification to the state reception unit 411 in operation S1502. In the event notification, the device ID and an identifier indicating the contents of the event (here, a sleep event) are handed over as parameters.

The state reception unit 411 which has received the event notification performs a resource information acquisition request as to the resource table 800 of the table storage 404 in operation S1503. In the resource information acquisition request, the device ID is handed over as a parameter. The table storage 404 responds to the state reception unit 411 in operation S1504 with the resource information corresponding to the requested device ID. Now, in operation S1505 the state reception unit 411 requests the resource table 800 of the table storage 404 to convert all resource URIs corresponding to the device ID acquired in operation S1502 (the print queue URI 804, scan queue URI 805, print container URI 806, and scan container queue URI 807) into global URIs.

Next, in operations S1506 and S1507, a queue message 600 is added to the print queue URI 804 and scan queue URI 805 obtained in operation S1504. The contents of this queue message 600 is such that the message type is KILL.

In operations S1508 and 1509, blob container URIs are instructed for each of printing and scanning, obtained in operation S1504, and the region is deleted.

Next, the instance of the printing backend processing unit 402 polls the queue storage 403 to periodically make an acquisition request for the queue message 600 in operation S1510. In the event that the queue message 600 is acquired from the queue storage 403 in operation S1511, the instance of the printing backend processing unit 402 extracts the message type. In the event that the message type is KILL, in operation S1512 a message deletion request is issued and the queue message 600 processed by the queue storage 403 is deleted. Thus, the queue message 600 corresponding to the task that has been processed is deleted from the queue storage 403, and re-execution processing due to timeout will not be performed. After this message deletion request, the instance of the printing backend processing unit 402 hands the instance ID of itself as a parameter to the printing fabric controller 412, and issues a deletion request for itself (S1513). Upon receiving the instance deletion request, the fabric controller 412 deletes this instance based on the received instance ID (S1514). That is to say, by way of queue messages the state reception unit 411 deletes (stops) the printing backend processing unit 402, which has been functioning as an exclusive resource (first resource). Thus, exclusive resources decrease.

With operations S1515 through S1519, the instance of the scanning backend processing unit 410 performs the same processing that the instance of the printing backend processing unit 402 has performed in operations S1510 through S1514, and the instance of the scanning backend processing unit 410 is deleted.

Description has been made so far regarding a flow in which, at the time of an image forming apparatus 104 to which an exclusive resource model has been applied making transition to a power saving state, the printing backend processing unit 402 and scanning backend processing unit 410 which had been exclusive resources are deleted.

The flow of the image forming apparatus 104 to which the exclusive resource model has been applied being recovered from the power saving state to a state in which image forming operations and image reading operations may be performed is as shown in operations S1521 through S1537 in FIG. 15. This is the same as the flow of processing from the sleep wake-up event issued being issued, from operations S1321 through S1337 in FIG. 13B, described with the first embodiment, so description thereof will be omitted.

With the present embodiment, as the result of resource adjustment based on the sleep wake-up event of the image forming apparatus 104, the amount of shared resources decrease, so the state reception unit 411 which has received the sleep wake-up event notification issues an instruction to the fabric controller 412 so as to increase the number of the backend processing units 402 and 410 serving as shared sources.

By deleting the resources as shown in the present embodiment, a state in which resources are hoarded, regardless of a state in which the apparatus 104 regarding which the exclusive resource model has been applied has gone to a power saving state and neither image forming operations nor image reading operations are executable, can be prevented. The resource adjustment shown in the present embodiment is particularly effective in a case of using a billing form cloud environment corresponding to the number of instances of virtual machines running. Also, at the time of sleep wake-up of the image forming apparatus 104 to which the exclusive resource model has been applied, the shared resources are re-appropriated as exclusive resources, so the exclusive resources may be re-secured with no loss in time.

Third Embodiment

With the first and second embodiments, resource adjustment has been made by the state reception unit 411 receiving notification of sleep events and sleep wake-up events of an image forming apparatus 104, but the state reception unit 411 may be notified of state events other than the sleep events and sleep wake-up events, so as to perform resource adjustment in accordance with the operating state of the image forming apparatus 104.

For example, the resource adjustment described with the first and second embodiments may be performed such that the state reception unit 411 receiving notification of a start-up event which is issued at the time of the image forming apparatus 104 starting up and a shut-down event issued at the time of the image forming apparatus 104 shutting down. In this case, the start-up event corresponds to the sleep-wake up event, and the shut-down event corresponds to the sleep event.

Also, in the event that a configuration is employed wherein the image forming apparatus 104 logs in and logs out of the network scan/print system, an arrangement may be made wherein the platform application 408 has a function for detecting login state and logout state of the image forming apparatus 104, and the resource adjustment may be performed with that the state reception unit 411 receives notification of a login event and logout event. In this case, the login event corresponds to the sleep-wake up event, and the logout event corresponds to the sleep event.

Also, an arrangement may be made wherein state reception unit 411 receives notification of state events such as malfunctions and errors to perform resource adjustment. In this case, a malfunction/error event corresponds to the sleep event, and recovery from the malfunction/error corresponds to the sleep wake-up event.

An embodiment has been described so far in which resource adjustments may be performed by notification of events other than events based on transition of the image forming apparatus 104 to a power saving state and recovery from the power saving state. Note that events based on the state of the image forming apparatus 104 described above are preferably state events which allow future resource usage states to be known. For example, a sleep or shut-down event of the image forming apparatus 104 allows prediction to be made that the image forming apparatus 104 will not issue job processing requests or use resources for the time being, and a sleep wake-up or start-up event allows prediction to be made that the image forming apparatus 104 will use these resources.

The present embodiment has shown that resource adjustment as with the first and second embodiments may be made by the image forming apparatus 104 issuing notification of state events of the image forming apparatus 104 to the state reception unit 411 other than transition to a power saving state and recovery from the power saving state.

Fourth Embodiment

With the first embodiment, both resource allocations for scanning and printing were changed based on a state event corresponding to the state of the image forming apparatus 104. With the present embodiment, one or the other of the resource allocations for scanning and printing are changed based on a state event corresponding to the state of the image forming apparatus 104.

Resource adjustment wherein allocation of printing resources are changed without operating scanning resources will be described with reference to FIG. 14A and FIG. 14B. Note that unless particularly noted, the network scan/print system according to the present embodiment is the same as that of the first embodiment.

With the first embodiment, resource adjustment was performed based on a state event issued in the case of the image forming apparatus 104 making transition to a power saving state and in a case of recovering from the power saving state. With the present embodiment, resource adjustment is performed for state events relating to consumables of the image forming apparatus 104. Examples of consumables include paper, ink, toner, and so forth, used for printing. Once these consumables are gone, the image forming apparatus 104 may not print from the printing unit. In this case, the usage efficiency deteriorates since, even if the printing resources are exclusively allocated to the image forming apparatus 104 to which an exclusive resource model has been allocated, the resources are not used.

The following is a description which will be made with reference to FIG. 14A and FIG. 14B regarding a case in which the device type to which the image forming apparatus 104 making transition to a power saving state is "special", i.e., the exclusive resource mode has been applied to the image forming apparatus 104, in the same way as with the description of the first embodiment.

FIG. 14A and FIG. 14B form a flow of performing resource adjustments such as resource allocation and so forth, but the state reception unit 411 receiving a consumables insufficiency event issued at the image forming apparatus 104 in the event of transitioning to a state where the amount of consumables is such that printing may not be performed, and a consumables replenishing event issued when the state transitions to a state in which consumables have been replenished to an amount such that printing may be performed. Note that at the beginning in FIG. 14A, the image forming apparatus 104 uses exclusive resources for both printing and scanning.

Now, in operation S1401, the detection unit 413 issues a consumables insufficiency event, and the platform application 408 receives this event. The processing of the subsequent operations S1402 through S1406 is the same as the operations S1302 through S1306 in FIG. 13. In FIG. 13, a message for the scanning backend is added to the scanning queue URI as operation S1307, but this is not performed in FIG. 14A or FIG. 14B. This is because the image forming apparatus 104 is capable of executing scanning functions with the reading unit event in the state that consumables are gone, so there is no need to change this before and after a consumables insufficiency event. Also, the state reception unit 411 deletes the printing region in operation S1408 but not the scanning region, for the same reason. Operations S1410 through S1413 are the same as operations S1310 through S1313 in FIG. 13A.

In the above flow, of the instances of the printing backend processing unit 402 and scanning backend processing unit 410 allocated as exclusive resources, just the instance of the printing backend processing unit 402 is allocated as a shared resource.

Next, upon consumables being replenished to the image forming apparatus 104, in operation S1421 the detection unit 413 issues a consumables replenishing event, and the platform application 408 receives this event. The processing of the subsequent operations S1422 through S1426 is the same as the operations S1322 through S1326 in FIG. 13B. In FIG. 13B, a scanning region is next secured as operation S1327, but this is not performed with the present embodiment, since the scanning region is already secured. Inclusion of the MOVE message to the queue is only performed for printing in operation S1428, and not for scanning. The processing of the operations S1430 through S1433 is the same as the operations S1330 through S1333 in FIG. 13B.

In the above flow, of the printing backend processing unit 402 and request reception unit 401 allocated as shared resources, just the printing backend processing unit 402 is allocated as an exclusive resource.

By the present embodiment, a state in which resources are hoarded, regardless of a state in which the apparatus 104 regarding which the exclusive resource model has been applied may not perform image forming operations due to a consumables insufficiency state, may be prevented, and deterioration in usage efficiency of resources may be alleviated. Further, resource adjustment is performed wherein allocation of resources relating to image reading operations, which are unrelated to the state of consumables, is left unchanged, whereby the user may still be provided with scanning services with the network scan/print system.

Note that besides state events relating to the state of consumables, resource adjustment may be performed based on state events relating to whether or not the printing unit 202 is usable, such as malfunctioning/error at the printing unit 202. That is to say, it is sufficient that the state event to be a state event where determination can be made regarding whether the state of the printing unit is available or unavailable, or a state event where determination can be made regarding state transition thereof.

Also, with the present embodiment, resource adjustment has been described as being performed based on a state event affecting the image forming operations by the printing unit of the image forming apparatus 104, but an arrangement may be made wherein resource adjustment is performed based on state events relating to whether or not the reading unit 203 is usable, such as malfunctioning/error at the reading unit 203, so as to perform resource adjustment such as changing allocation of scanning resources, without operating printing resources.

Further, the resource adjustment according to the present embodiment has been described as just changing allocation of resources between exclusive resources and shared resources as with the resource adjustment in the first embodiment, but this may be resource adjustment by deleting resources, such as described with the second embodiment.

Fifth Embodiment

With the first through fourth embodiments, the detection unit 413 detects transition of the state of a image forming apparatus 104 to which an exclusive resource model has been applied as a state event, and the platform application 408 notifies this state event to the state reception unit 411. The state reception unit 411 which has received this notification performs resource adjustment.

With the present embodiment, an embodiment will be described in which the timing at which the detection unit 413 detects the state transition of the image forming apparatus 104 and the timing at which the state reception unit 411 starts resource adjustment differ. For example, the detection unit 413 issues a sleep wake-up event where the image forming apparatus 104 recovers from a power saving state and transitions to the normal state, and the platform application 408 which has received this notifies a sleep wake-up event, or an event corresponding thereto, to the state reception unit 411, after a suitable amount of time has elapsed after the detection unit 413 has issued the event. Resource adjustment is then started. This timing may be at the timing at which the device browser 409 gives the first job processing request to the request reception unit 401 after the image forming apparatus 104 recovering from the power saving state, or may be a timing of several seconds to several minutes, which is an amount of time that the image forming apparatus 104 recovering from the power saving state may be ensured or expected to not request processing of a job. Thus, the period that resources are hoarded may be reduced, and deterioration in the usage efficiency of resources may be further reduced.

Also, for example, an arrangement may be made wherein the detection unit 413 issues a sleep wake-up event where the image forming apparatus 104 recovers from a power saving state and transitions to the normal state, the platform application 408 which has received this notifies a sleep wake-up event to the state reception unit 411, and the state reception unit 411 starts resource adjustment at a timing after a suitable amount of time has elapsed after the state reception unit 411 has received the event notification. This timing may be a timing such as described above.

Sixth Embodiment

Description has been made with the first through fifth embodiments of the present invention regarding a case of performing resource adjustment in a network scan/pint system where the two types of resources models of an exclusive resource model in which one image forming apparatus exclusively posses a certain amount of resources, and a shared resource model in which multiple image forming apparatuses share a certain amount of resources, coexist. However, the present invention is not restricted to resource adjustment between exclusive resources and shared resources, and it is sufficient for resource adjustment to be performed among different resource models.

For example, an arrangement may be made with a network scan/print system having multiple exclusive resource models wherein, upon the state reception unit 411 receiving notification of a state event of an image forming apparatus 104 to which one exclusive resource model has been applied, allocation of the resources of the one exclusive resource model is changed so as to be usable as resources of another exclusive resource mode. In this case, the URIs following change at the resource table 800 in operation S1305 shown in FIG. 13A in the first embodiment, for example, is not changed to global URIs but URIs of an exclusive resource of an image forming apparatus 104 of another exclusive resource mode. Addition of the queue message 600 in operations S1328 and S1329 may be executed as to queue URIs changed in operation S1305 in this case (exclusive resource queue URIs of an image forming apparatus 104 to which another exclusive resource model has been applied). In the same way, the present invention is also applicable to a network scan/print system having multiple shared resource models.

While a network scan/print system has been described with the first through sixth embodiments of the present invention, the present invention is not restricted to a network scan/print system, and may also be applied to a client-server system in which PC terminals 105 and other devices which notify the state reception unit 411 of state events are clients. Also, note that the internal configuration of the image forming apparatus 104 and information processing apparatus 106 described in the first through sixth embodiments are but an example, and other internal configurations may be used as long as the present invention may be carried out.

Also, while description has been made in the embodiments regarding an arrangement wherein one instance (virtual machine) runs on one server computer, the present invention is not restricted to this arrangement, and for example, an arrangement may be conceived for a server computer having a multi-core CPU in which one instance is realized for one core. Also, a multi-thread capable server computer is capable of each CPU realizing at least one or more (e.g., two, three, etc.) virtual machines. Thus, the present invention is not restricted in the method how to realize one instance, and various changes may be made.

Also note that in addition to the above-described first through sixth embodiments, combinations of a plurality of these are also understood to be embodiments of the present invention.

Other Embodiments

Aspects of the embodiments may also be realized by a computer of a system or apparatus (or devices such as a CPU or microprocessor unit (MPU)) that reads out and executes a program recorded/stored on an article of manufacture having a memory device or a non-transitory storage medium to perform the functions of the above-described embodiment(s), and by a method, the operations of which are performed by a computer of a system or apparatus by, for example, reading out and executing a program or instructions recorded/stored on a memory device to perform the functions of the above-described embodiment(s). For this purpose, the program is provided to the computer for example via a network or from a recording medium of various types serving as the memory device (e.g., computer-readable medium).

Disclosed aspects of the embodiments may be realized by an apparatus, a machine, a method, a process, or an article of manufacture that includes a non-transitory storage medium having a program or instructions that, when executed by a machine or a processor, cause the machine or processor to perform operations as described above. The method may be a computerized method to perform the operations with the use of a computer, a machine, a processor, or a programmable device. The operations in the method involve physical objects or entities representing a machine or a particular apparatus (e.g., an information processing apparatus, a state acquisition unit, an adjusting unit). In addition, the operations in the method transform the elements or parts from one state to another state. The transformation is particularized and focused on adjusting a resource requested from an information processing apparatus. The transformation provides a different function or use such as reducing a first resource and changing a second resource.

In addition, elements of one embodiment may be implemented by hardware, firmware, software or any combination thereof. The term hardware generally refers to an element having a physical structure such as electronic, electromagnetic, optical, electro-optical, mechanical, electro-mechanical parts, etc. A hardware implementation may include analog or digital circuits, devices, processors, applications specific integrated circuits (ASICs), programmable logic devices (PLDs), field programmable gate arrays (FPGAs), or any optical, electromechanical, electromagnetic, or electronic devices. The term software generally refers to a logical structure, a method, a procedure, a program, a routine, a process, an algorithm, a formula, a function, an expression, etc. A software implementation typically includes realizing the above elements (e.g., logical structure, method, procedure, program) as instruction codes and/or data elements embedded in one or more storage devices and executable and/or accessible by a processor, a CPU/MPU, or a programmable device as discussed above. The term firmware generally refers to a logical structure, a method, a procedure, a program, a routine, a process, an algorithm, a formula, a function, an expression, etc., that is implemented or embodied in a hardware structure (e.g., flash memory). Examples of firmware may include microcode, writable control store, micro-programmed structure. When implemented in software or firmware, the elements of an embodiment may be the code segments to perform the necessary tasks. The software/firmware may include the actual code to carry out the operations described in one embodiment, or code that emulates or simulates the operations.

All or part of an embodiment may be implemented by various means depending on applications according to particular features, functions. These means may include hardware, software, or firmware, or any combination thereof. A hardware, software, or firmware element may have several modules or units coupled to one another. A hardware module/unit is coupled to another module/unit by mechanical, electrical, optical, electromagnetic or any physical connections. A software module/unit is coupled to another module by a function, procedure, method, subprogram, or subroutine call, a jump, a link, a parameter, variable, and argument passing, a function return, etc. A software module/unit is coupled to another module/unit to receive variables, parameters, arguments, pointers, etc. and/or to generate or pass results, updated variables, pointers, etc. A firmware module/unit is coupled to another module/unit by any combination of hardware and software coupling methods above. A hardware, software, or firmware module/unit may be coupled to any one of another hardware, software, or firmware module/unit. A module/unit may also be a software driver or interface to interact with the operating system running on the platform. A module/unit may also be a hardware driver to configure, set up, initialize, send and receive data to and from a hardware device. An apparatus may include any combination of hardware, software, and firmware modules/units.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-181896 filed Aug. 16, 2010, which is hereby incorporated by reference herein in its entirety.

What is claimed is:

1. A resource adjusting apparatus for adjusting a first resource which is able to process a job requested from a first information processing apparatus and a second resource which is able to process a job requested from a second information processing apparatus, the apparatus comprising:

a state acquisition unit configured to acquire information indicating a transition of an operating state of the first information processing apparatus; and an adjusting unit configured to adjust the first resource so that the first resource does not process a job requested from the first information processing apparatus, in response to that the state acquisition unit has acquired information indicating a transition from a first operating state to a second operating state of the operating state, and adjust the second resource so that the second resource does process a job requested from the first information processing apparatus in response to the state acquisition unit has acquired information indicating a transition from the second operating state to the first operating state of the operating state;

wherein the first resource is located in an apparatus which is outside of the first and second information processing apparatuses, and wherein the second resource is located in an apparatus which is outside of the first and second information processing apparatuses.

2. The apparatus according to claim 1, wherein, in response to that the state acquisition unit has acquired the information indicating a transition from the first operating state to the second operating state of the operating state, the adjusting unit further adjusts the first resource so that the first resource does process a job requested from the second information processing apparatus.

3. The apparatus according to claim 1, wherein, in response to that the state acquisition unit has acquired the information indicating a transition from the first operating state to the second operating state of the operating state, the adjusting unit adjusts the first resource so that the first resource shuts down.

4. The apparatus according to claim 1, wherein the information indicating a transition from the first operating state to the second operating state of the operating state is information indicating a transition from at least a wake-up state or a shut-down state to at least a sleep state or a start-up state;

and wherein the information indicating a transition from the second operating state to the first operating state of the operating state is information indicating a transition from at least a sleep state or a shut-down state to at least a wake-up state or a start-up state.

5. The apparatus according to claim 1, wherein the first information processing apparatus comprises a printing unit, wherein the information indicating a transition from the first operating state to the second operating state of the operating state is information indicating a transition from an operating state where the printing unit is available to an operating state where the printing unit is unavailable;

and wherein the information indicating a transition from the second operating state to the first operating state of the operating state is information indicating a transition from an operating state where the printing unit is unavailable to an operating state where the printing unit is available.

6. The apparatus according to claim 1, wherein the first information processing apparatus comprises a reading unit, wherein the information indicating a transition from the first operating state to the second operating state of the operating state is information indicating a transition from an operating state where the reading unit is available to an operating state where the reading unit is unavailable;

and wherein the information indicating a transition from the second operating state to the first operating state of the operating state is information indicating a transition from an operating state where the reading unit is unavailable to an operating state where the reading unit is available.

7. The apparatus according to claim 1, wherein the first and second information processing apparatuses are image forming apparatuses.

8. The apparatus according to claim 1, wherein the first and second resources are virtual machines launched on at least one or more external servers.

9. An adjusting system comprising:

first and second information processing apparatuses which request processing of jobs;

a first resource which is able to process a job requested from the first information processing apparatus, wherein the first resource is located in an apparatus which is outside of the first and second information processing apparatuses;

a second resource which is able to process a job requested from the second information processing apparatus, wherein the second resource is located in an apparatus which is outside of the first and second information processing apparatuses; and an adjusting apparatus configured to adjust the first and second resources;

the first information processing apparatus including
a notification unit configured to
notify first information to the adjusting apparatus in response to that the first information processing apparatus has transitioned from a first state to a second state, and
notify second information to the adjusting apparatus in response to that the first information processing apparatus has transitioned from the second state to the first state; and the adjusting apparatus including
a state acquisition unit configured to acquire information notified from the notification
an adjusting unit configured to
adjust the first resource so that the first resource does not process a job requested from the first information processing apparatus, in response to the state acquisition unit has acquired the first information, and
adjust the second resource so that the second resource does process a job requested from the first information processing apparatus in response to the state acquisition unit has acquired the second information.

10. The system according to claim 9, wherein, in response to that the state acquisition unit has acquired the information indicating a transition from a first operating state to a second operating state of the operating state, the adjusting unit further adjusts the first resource so that the first resource does process a job requested from the second information processing apparatus.

11. The system according to claim 9, wherein, in response to that the state acquisition unit has acquired the information indicating a transition from the first operating state to the second operating state of the operating state, the adjusting unit adjusts the first resource so that the first resource shuts down.

12. The system according to claim 9, wherein the information indicating a transition from the first operating state to the second operating state of the operating state is information indicating a transition from at least a wake-up state or a shut-down state to at least a sleep state or a start-up state;

and wherein the information indicating a transition from the second operating state to the first operating state of the operating state is information indicating a transition from at least a sleep state or a shut-down state to at least a wake-up state or a start-up state.

13. The system according to claim 9,
wherein the first information processing apparatus comprises a printing unit,
wherein the information indicating a transition from the first operating state to the second operating state of the operating state is information indicating a transition from an operating state where the printing unit is available to an operating state where the printing unit is unavailable;

and wherein the information indicating a transition from the second operating state to the first operating state of the operating state is information indicating a transition from an operating state where the printing unit is unavailable to an operating state where the printing unit is available.

14. The system according to claim 9,
wherein the first information processing apparatus comprises a reading unit,
wherein the information indicating a transition from the first operating state to the second operating state of the operating state is information indicating a transition from an operating state where the reading unit is available to an operating state where the reading unit is unavailable;
and wherein the information indicating a transition from the second operating state to the first operating state of the operating state is information indicating a transition from an operating state where the reading unit is unavailable to an operating state where the reading unit is available.

15. The system according to claim 9, wherein the first and second information processing apparatuses are image forming apparatuses.

16. The system according to claim 9, wherein the first and second resources are virtual machines launched on at least one or more external servers.

17. A resource adjusting system for adjusting a first resource which is able to process a job requested from a first information processing apparatus via a network and a second resource which is able to process a job requested from a second information processing apparatus via a network, the system comprising:
   a state acquisition unit configured to acquire information relating to a state of the first information processing apparatus; and
   an adjusting unit configured to adjust increase or decrease of each of the first resource and the second resource, on the basis of the information acquired by the state acquisition unit;
   wherein the first resource is located in an apparatus which is outside of the first and second information processing apparatuses, and
   wherein the second resource is located in an apparatus which is outside of the first and second information processing apparatuses.

18. An information processing system comprising:
   a request reception unit configured to
      receive a processing request from a first apparatus and store a queue message corresponding to the received processing request in a first storage unit, and
      receive a processing request from a second apparatus and store a queue message corresponding to the received processing request in a second storage unit;
   a first backend processing unit configured to
      repeatedly perform acquisition request of the queue message stored in the first storage unit by the request reception unit, and
      in event of acquiring the queue message, perform processing based on the acquired queue message;
   a second backend processing unit configured to
      repeatedly perform acquisition request of the queue message stored in the second storage unit by the request reception unit, and
      in event of acquiring the queue message, perform processing based on the acquired queue message; and
   a state reception unit configured to receive information distinguishing transition of a state of the first apparatus;
   wherein the state reception unit acts to
      store, in the first storage unit, a queue message to change the queue message acquisition request destination of the first backend processing unit from the first storage unit to the second storage unit, in event that the information acquired by the state reception unit is first information for distinguishing the transition from a first state to a second state, and
      store, in the second storage unit, a queue message to change the queue message acquisition request destination of the second backend processing unit from the second storage unit to the first storage unit, in event that the information acquired by the state reception unit is second information for distinguishing transition from the second state to the first state.

19. An information processing system comprising:
   a request reception unit configured to
      receive a processing request from a first apparatus and store a queue message corresponding to the received processing request in a first storage unit, and
      receive a processing request from a second apparatus and store a queue message corresponding to the received processing request in a second storage unit;
   a first backend processing unit configured to
      repeatedly perform acquisition request of the queue message stored in the first storage unit by the request reception unit, and
      in event of acquiring a queue message, perform processing based on the acquired queue message;
   a second backend processing unit configured to
      repeatedly perform acquisition request of the queue message stored in the second storage unit by the request reception unit, and
      in event of acquiring a queue message, perform processing based on the acquired queue message;
   a state reception unit configured to receive information distinguishing transition of a state of the first apparatus; and
   a control unit configured to control stopping of the first backend processing unit;
   wherein the state reception unit acts to
      store, in the first storage unit, a queue message to cause the control unit to stop the first backend processing unit, in event that the information acquired by the state reception unit is first information for distinguishing the transition from a first state to a second state, and
      store, in the second storage unit, a queue message to change the queue message acquisition request destination of the second backend processing unit from the second storage unit to the first storage unit, in event that the information acquired by the state reception unit is second information for distinguishing the transition from the second state to the first state.

* * * * *